United States Patent

[11] 3,619,567

| [72] | Inventor | Richard T. Scott<br>6161 Grove St., Omaha, Nebr. 68106 |
|---|---|---|
| [21] | Appl. No. | 820,892 |
| [22] | Filed | May 1, 1969 |
| [45] | Patented | Nov. 9, 1971 |

[54] METHOD AND APPARATUS FOR ENCODING AND RECORDING ESTIMATING DATA
42 Claims, 17 Drawing Figs.

| [52] | U.S. Cl. | 235/61.1, 235/61.6 R |
|---|---|---|
| [51] | Int. Cl. | G06k 1/02, G06k 15/18 |
| [50] | Field of Search | 235/61.1, 61.6 R; 340/172.5 |

[56] References Cited
UNITED STATES PATENTS

| 3,023,952 | 3/1962 | Thomas | 235/61.1 |
|---|---|---|---|
| 3,302,189 | 1/1967 | Karkowski et al. | 340/172.5 X |
| 3,315,235 | 4/1967 | Carnevale et al. | 340/172.5 |
| 3,335,407 | 8/1967 | Lange et al. | 340/172.5 |

*Primary Examiner*—Daryl W. Cook
*Attorney*—Scofield, Kokjer, Scofield & Lowe

ABSTRACT: A method and system apparatus for encoding the description of items and individual quantities thereof which are described by related variables. The system includes a control panel, remote power source and a terminating device such as a card punch or an online computer. When the system uses a card punch as the terminating device, punch cards are produced which have sufficiently encoded the description and quantity of components (used in building construction) thereon to enable the cards to be processed in small computers or bookkeeping machines for estimating purposes.

The method includes the steps of presetting the relationships between dependent and independent variables, labeling the origin of said items, describing the characteristics of each of said items, quantitizing the amount of each item described by said variables, and displaying visually the related variables prior to the final encoding processing of the information.

INVENTOR
Richard T. Scott

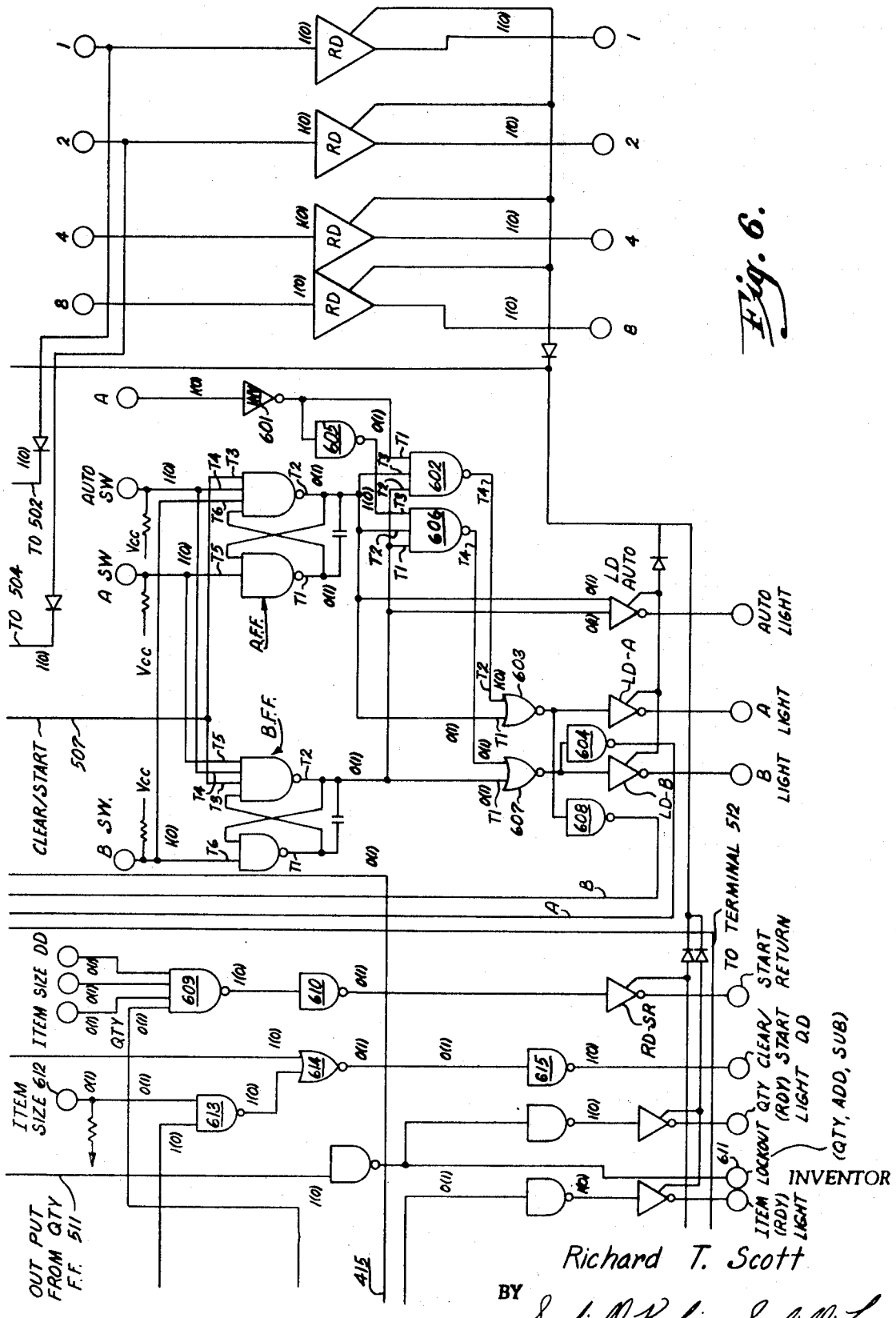

INVENTOR
Richard T. Scott

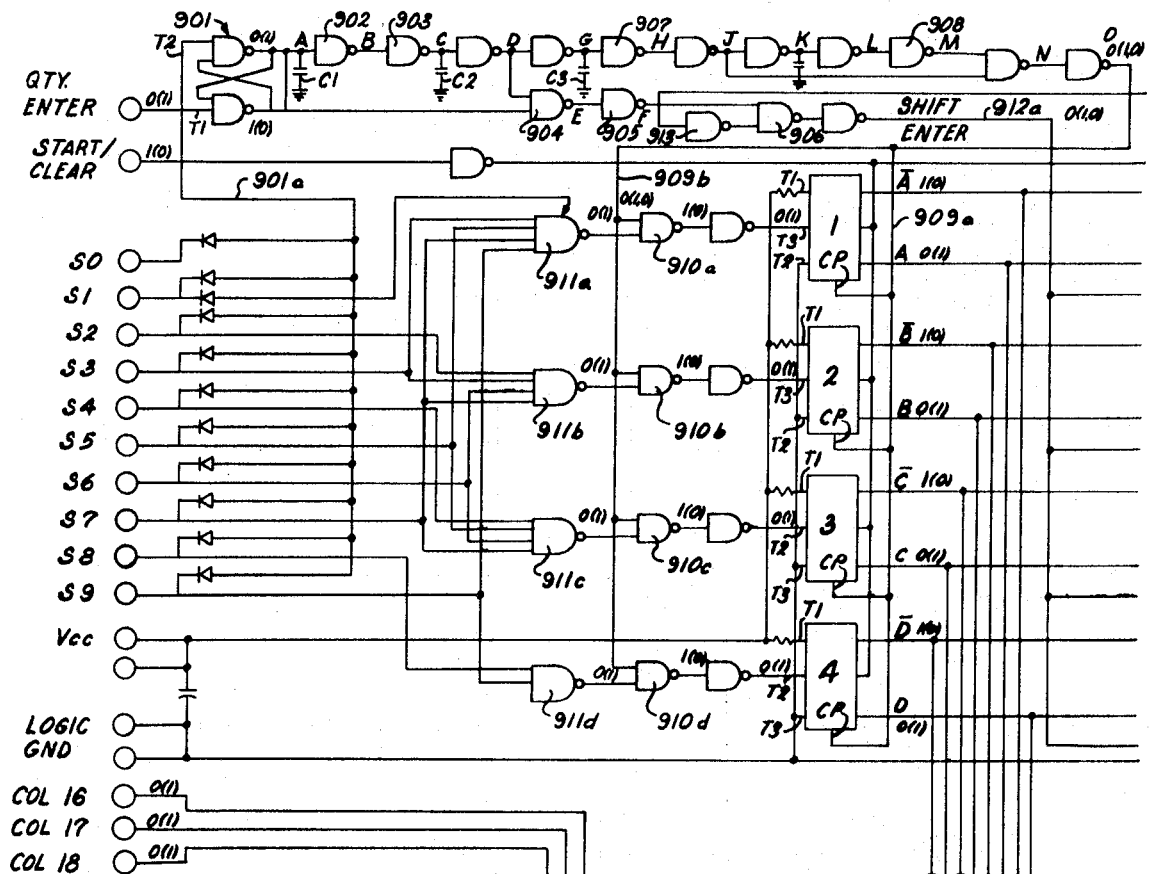
Fig. 9a.
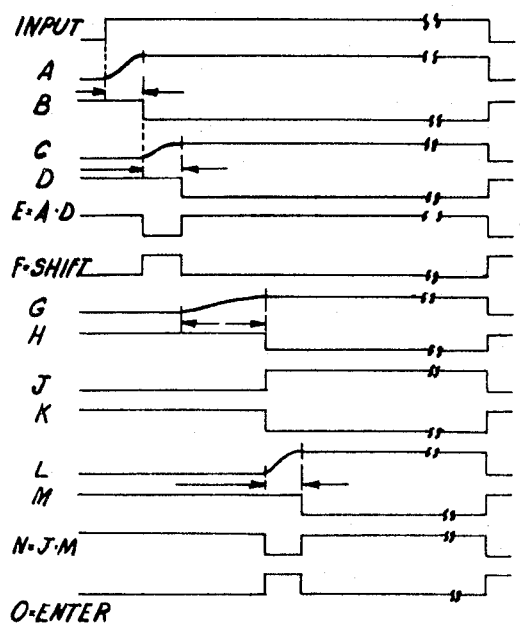
Fig. 9c.
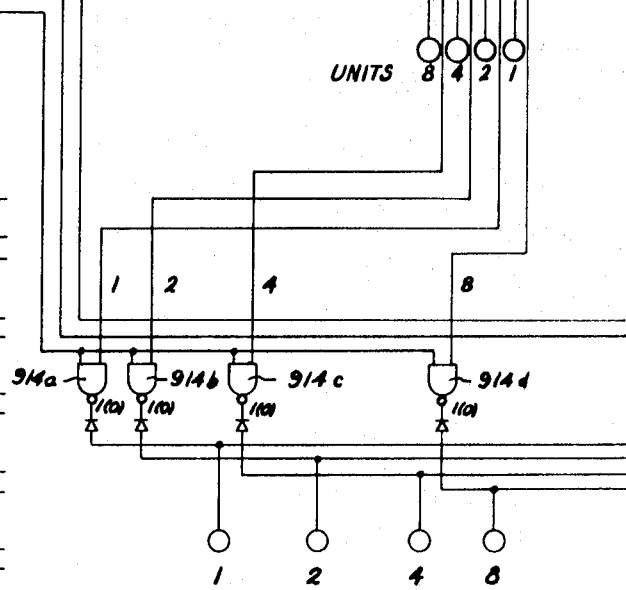
INVENTOR
Richard T. Scott

INVENTOR
Richard T. Scott

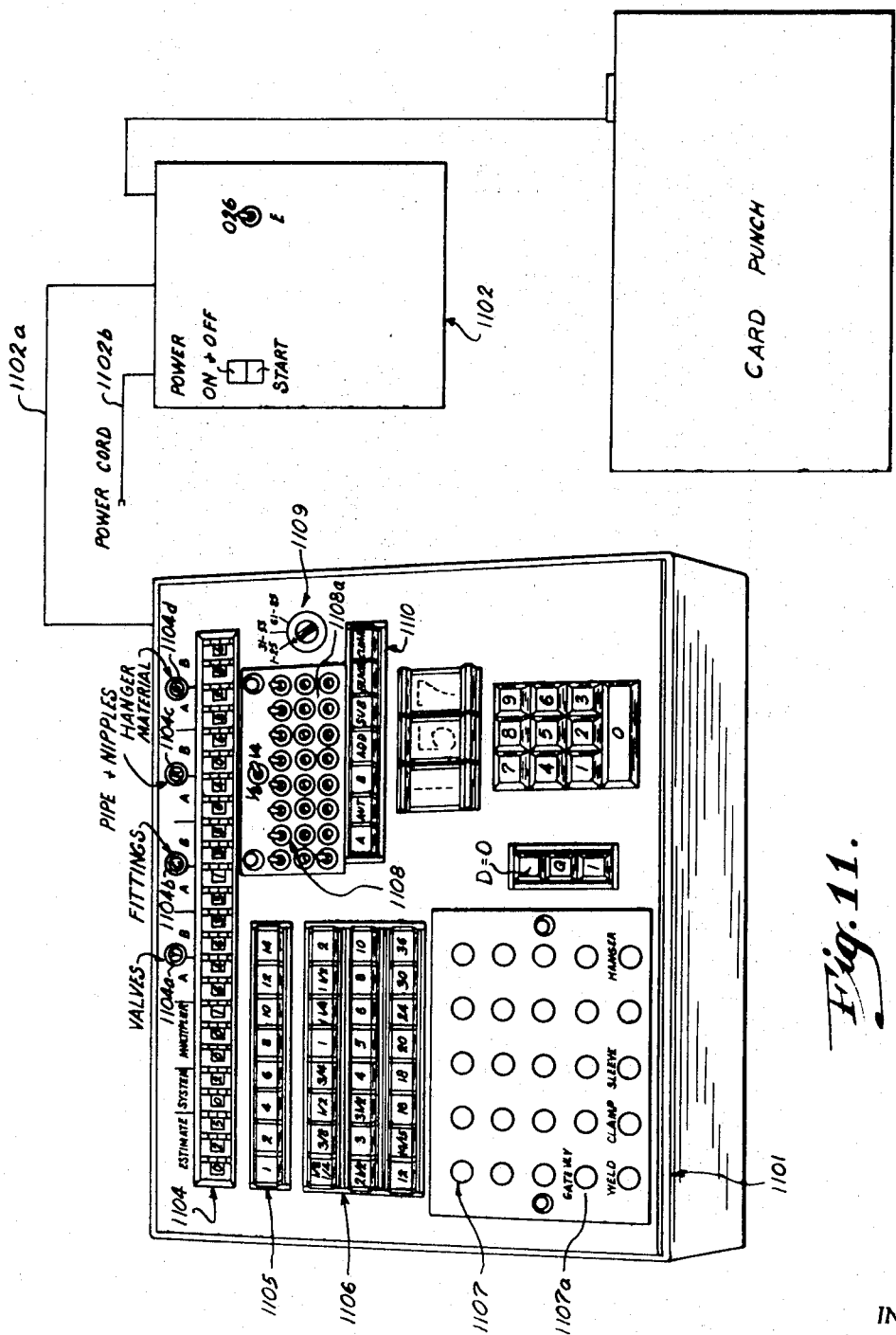

METHOD AND APPARATUS FOR ENCODING AND RECORDING ESTIMATING DATA

BACKGROUND AND BRIEF DESCRIPTION OF THE INVENTION

My invention primarily relates to a device which encodes the description and quantity of components, used in building construction, and controls the operation of a card punch to record the encoded information.

As nearly all material and service estimators in the building construction industry recognize, the task of detailing, accumulating and tabulating labor and materials prior to submitting estimates is an extremely tedious, time consuming and arduous job. Furthermore, the possibility for error due to fatigue and tedium resulting from the long hours required to complete the accounting and estimating functions and from the requirement of written data transfer from blue print drawings to estimating code sheets, etc., is ever present. My invention will operate to significantly reduce the effort and inherent errors in construction estimating, therefore enabling more competitive and more realistic bids to be submitted on competitive jobs. It should, however, be stressed that with slight variations in my device it may also have considerable utility in the encoding and recording of quantities of parts, labor distribution and payroll preparation in several other industries such as electrical, general construction and manufacturing industries in which a large number of parts are continually used and consumed.

The device which embodies many of the features of my invention will encode and record the following information:

1. The job or estimate number of the project on which the part is to be used;
2. The system or subproject on which the part is to be used;
3. The depth of the ditch on which the part is to be buried. This code can also be used to indicate a variation from a standard part size as will be explained in more detail later;
4. The generic name of the part;
5. The nominal size of the part;
6. The material specification for the material from which the part is made;
7. The instruction to the computer which processes the punch card to tell the computer whether to add, subtract or disregard the quantity shown on the card, when computing the total number of like parts on the project; and
8. The factor by which a computer should multiply the number of parts shown on the card to obtain the total number of parts represented by the specific punched card.

As will be seen, my invention operates in conjunction with a conventional card punch in such a way that all descriptive information is punched into the card when quantity buttons on the control panel of my estimating device are depressed and all quantity information is punched into the card when descriptive pushbuttons are depressed. Therefore, no "program start" or "punch card" button is required to initiate the recording cycle.

The use of punch cards for output documents permits the processing of information on very small computers or bookkeeping machines. Since computing machines of this size and general nature are relatively common in medium or large size building construction firms, the significance of the punch card is realized. The counting and estimating functions of most contracting offices are done on a crash basis at all hours of the day and night, therefore it is imperative that the output of the accounting process be in a form acceptable to the computing machines which the contractor is likely to have in his own office.

Punch cards also allow the user of my invention an almost unlimited number of possible specification combinations. Nomenclature on the descriptive buttons of the control panel can be easily changed by the operator for any of a varied number of specifications. I consider capability to produce punch cards to be very important. Other attempts at estimating machines have suggested the use of punched paper tape as their output, thereby requiring a rather large and expensive computer for processing as well as necessitating the makeup of a separate tape for each combination of specifications for the material.

I have separated the module housings for the structural elements of my invention into (1) an input control panel and (2) a power and program control. This cuts down significantly on the size of the input device so that it may be easily moved about upon an operator's desk or tabletop. The input control panel may be placed some distance away from the power and program device which is, more than likely, near the card punch. The indicator lights on the control panel will show the operator what is stored in the memory and what the program control was doing at all times so that close proximity of the operator to the power and program device is not required.

An object of my invention is to provide a unique method and apparatus for facilitating the rapid accumulation of data so that data processing machines may handle same.

Another object of my invention is to provide a uniquely constructed encoding apparatus and novel method which simplifies the accumulation of data for estimating purposes.

A further object of my invention is to provide an encoding apparatus of the character described which visually displays and categorizes the accumulated information prior to encoding, thereby permitting a visual check for possible error each time the encoding step is performed.

Another object of my invention is to provide an encoding apparatus of the character described which is extremely versatile in its capability to handle various types of information for encoding purposes and recording. It is an important feature of my invention that the several pushbuttons on the control panel thereof are not limited to controlling circuitry for a single function, but rather the pushbutton may be assigned various arbitrary designations depending solely on the subject matter involved and convenience of the operator. In this regard, my device could be utilized for payroll calculations, cost analysis and inventory control, as well as other similar type jobs.

A still further object of my invention is to provide an encoding apparatus capable of remembering specific information concerning certain items and associate this remembered information with each item having particular characteristics.

One of the primary objects of my invention is to provide a unique method and system apparatus which when used for estimating purposes, will improve and increase the estimator operator's efficiency and accuracy, while at the same time reduce the tedium and drudgery heretofore associated with the task of contractor type estimating.

A further object of my invention is to provide a unique apparatus system which is capable of producing a punch card having all information on same relating to a particular item. As a result, a unit record is produced having a total description thereon so random access to this particular type of data need not be performed serially such as when the data is stored on tape.

A still further object of my invention is to provide an estimating system which includes a control panel and a card punch with the control panel being operably positionable at a location remote from the card punch (the control panel can be as much as 150 feet away from the card punch). As a result, the operator may be isolated from distracting functional noises normally associated with an operating card punch.

Another object of my invention is to provide an estimating system that reduces the possibility of human error. It is an important feature of my invention that it is capable of accurately accumulating raw data into a unit record per item and to utilize each unit record in data processing machines. In this manner, the virtually error free machines perform as many of the procedures necessary in the estimating process as possible.

A further object of my invention is to provide an estimating system of the character described which allows the operator of the system to make an error and to either rectify same or cause the machine processing the unit record data having the error therein to disregard same.

A still further object of my invention is to provide an estimating system that may be utilized with either very small computers (core storage of not more than 200 words) or bookkeeping machines commonly found in most contractors' offices.

Another object of my invention is to provide an estimating system including a remote control panel and a terminating device such as a card punch which, in case of a failure in either unit, permits the operator to know, almost immediately (within one card punch) where the failure is located.

Another object of my invention is to provide in an estimating system having a remote control panel and a terminating device such as a card punch, a control panel keyboard that is jam proof so that inadvertent entry of certain data is effectively precluded.

A further object of my invention is to provide in an estimating system of the character described a uniquely operated and constructed control circuitry inherent in certain functions of the control panel, the memory associated therewith and the general operation of the estimating system.

Other and further objects of the invention, together with the features of novelty appurtenant thereto, will appear in the course of the following description.

DETAILED DESCRIPTION

In the accompanying drawings, which form a part of the specification, and are to be read in conjunction therewith, like reference numerals are employed to indicate like parts in the various views.

FIG. 1b is a schematic circuit diagram of the lower portion of the Ditch Depth circuit board that interconnects with FIG. 1a.

Figure 1A:
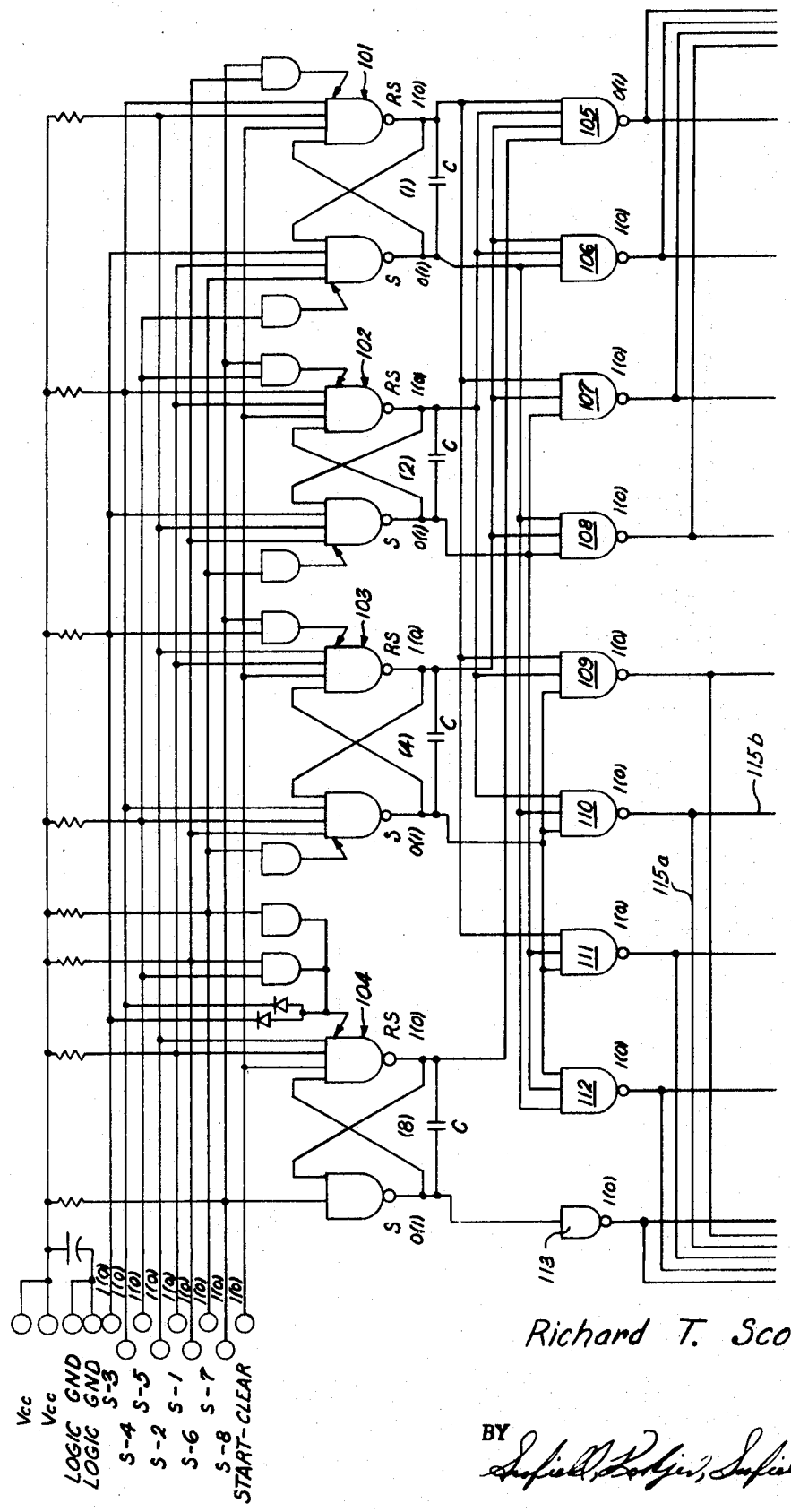
FIG. 1a is a schematic circuit diagram of the upper portion of the Ditch Depth circuit board.
Figure 1B:
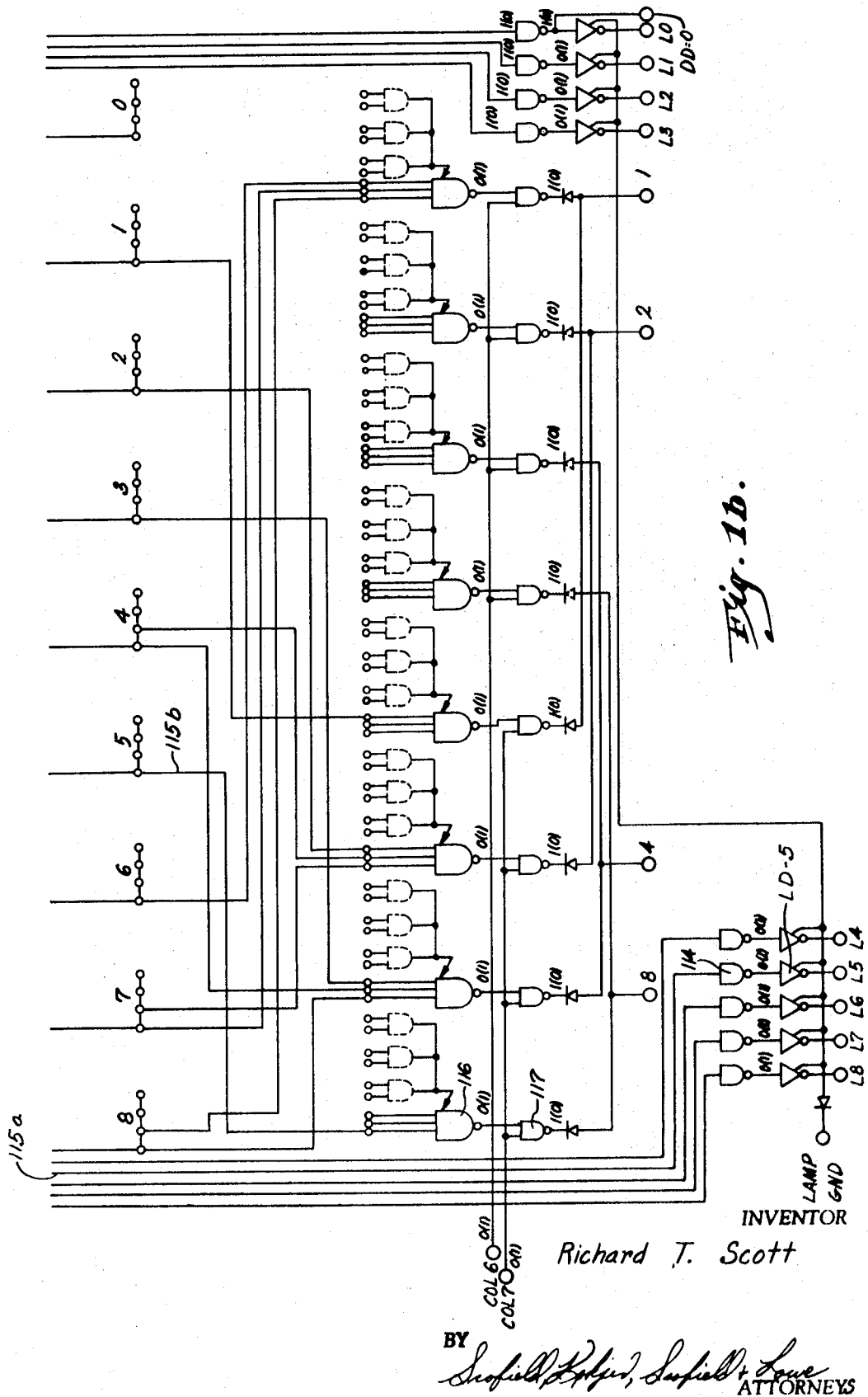
Figure 9B:
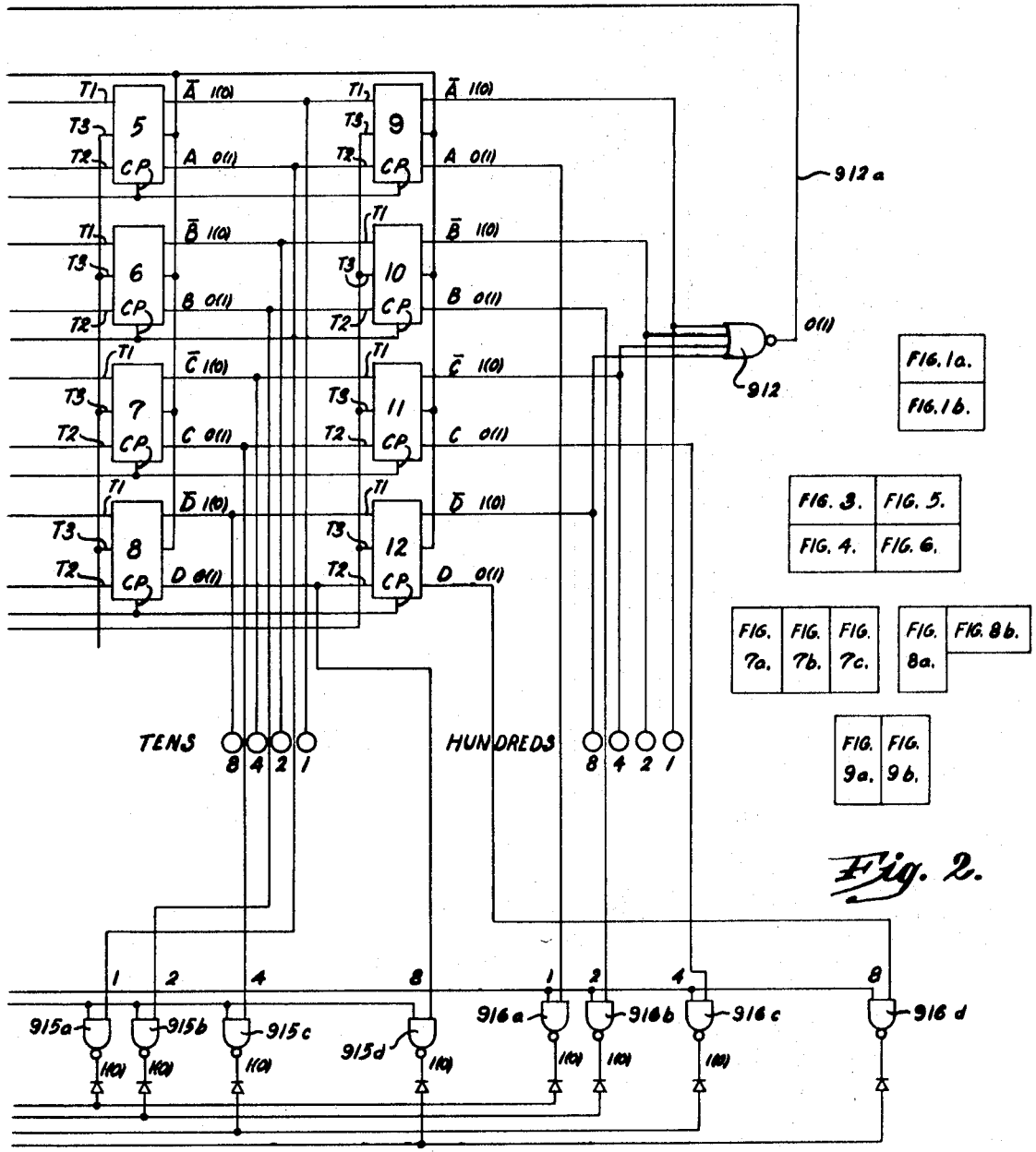
Figure 3:
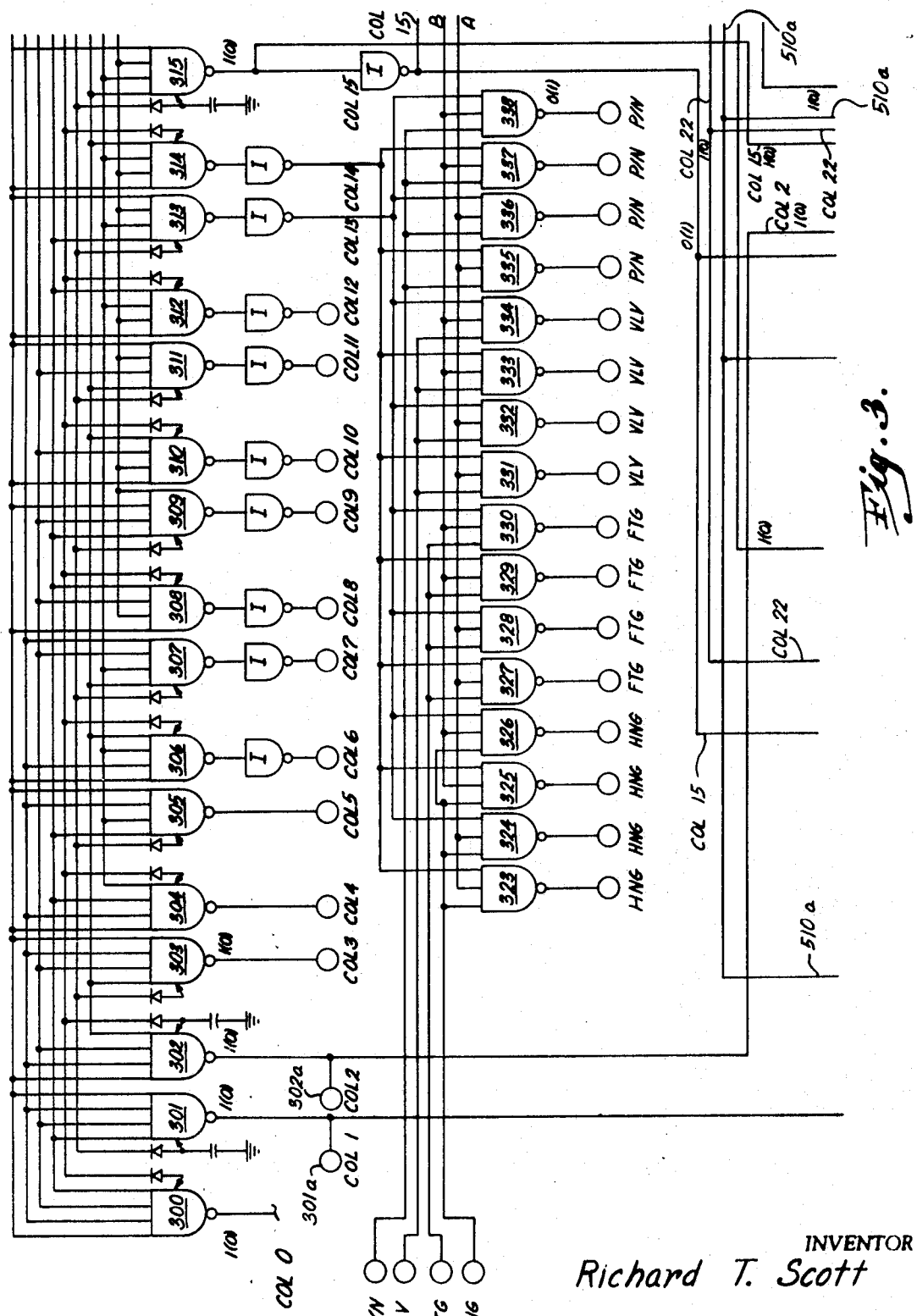
Figure 4:
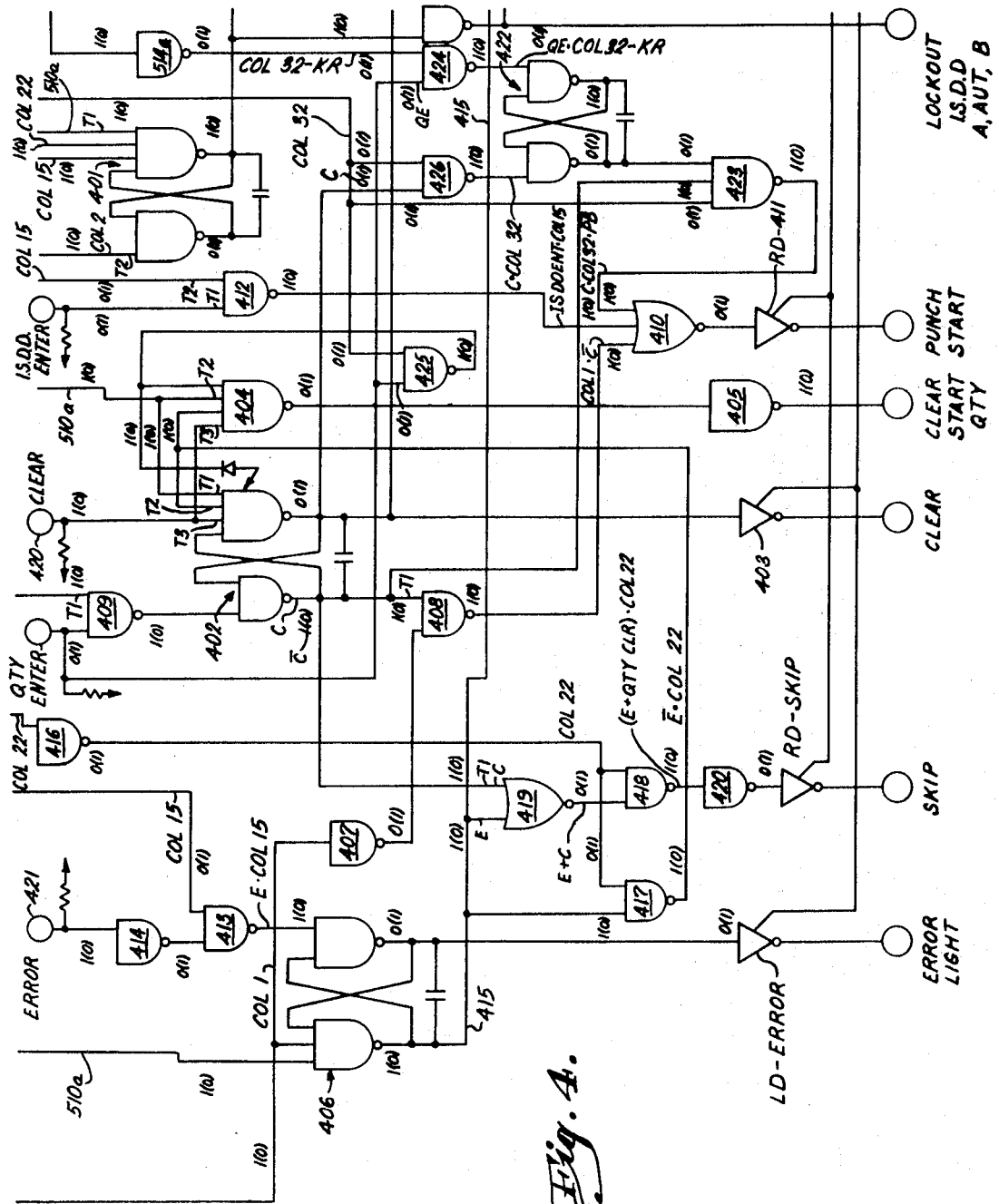
Figure 5:
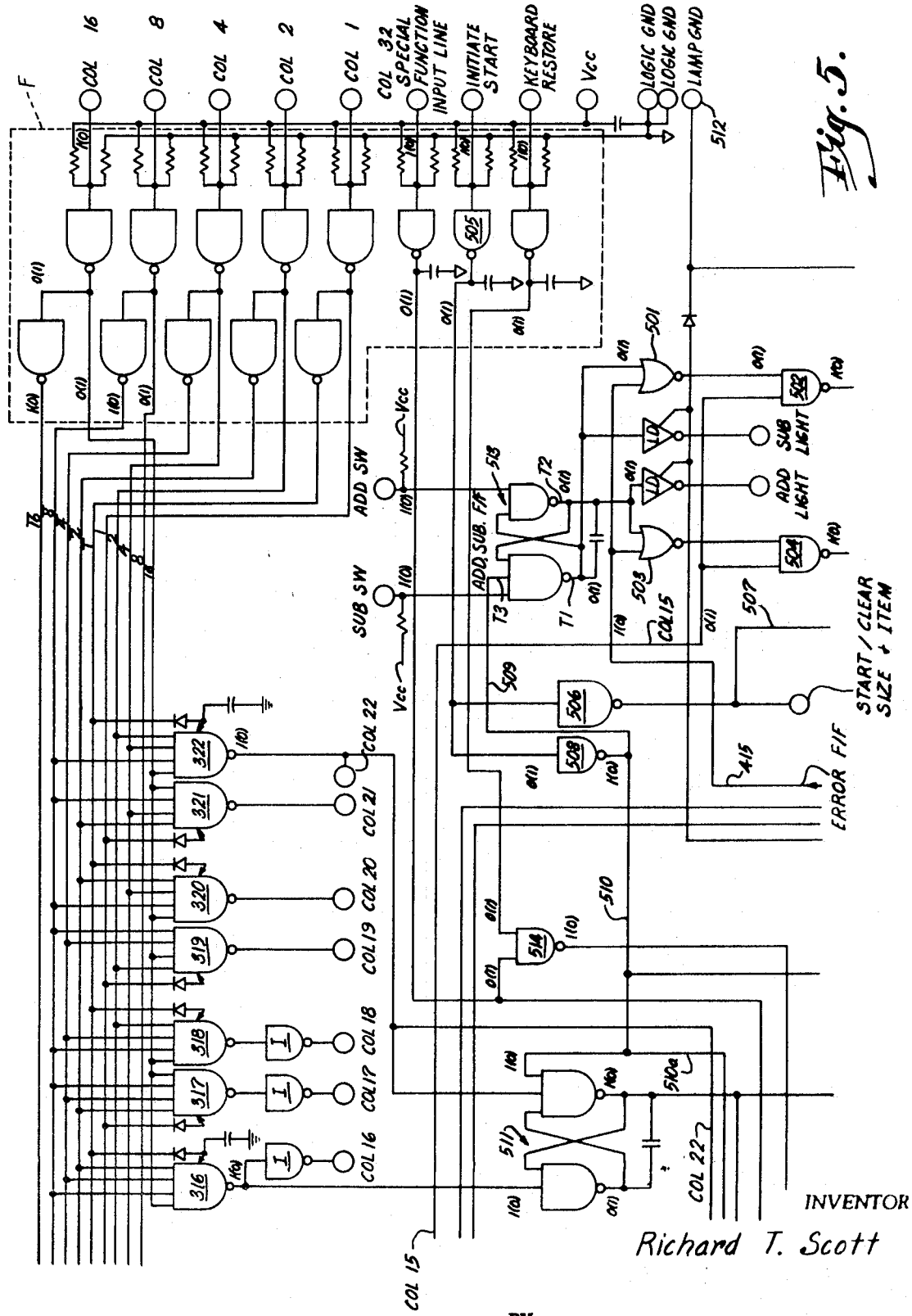
Figure 7A:
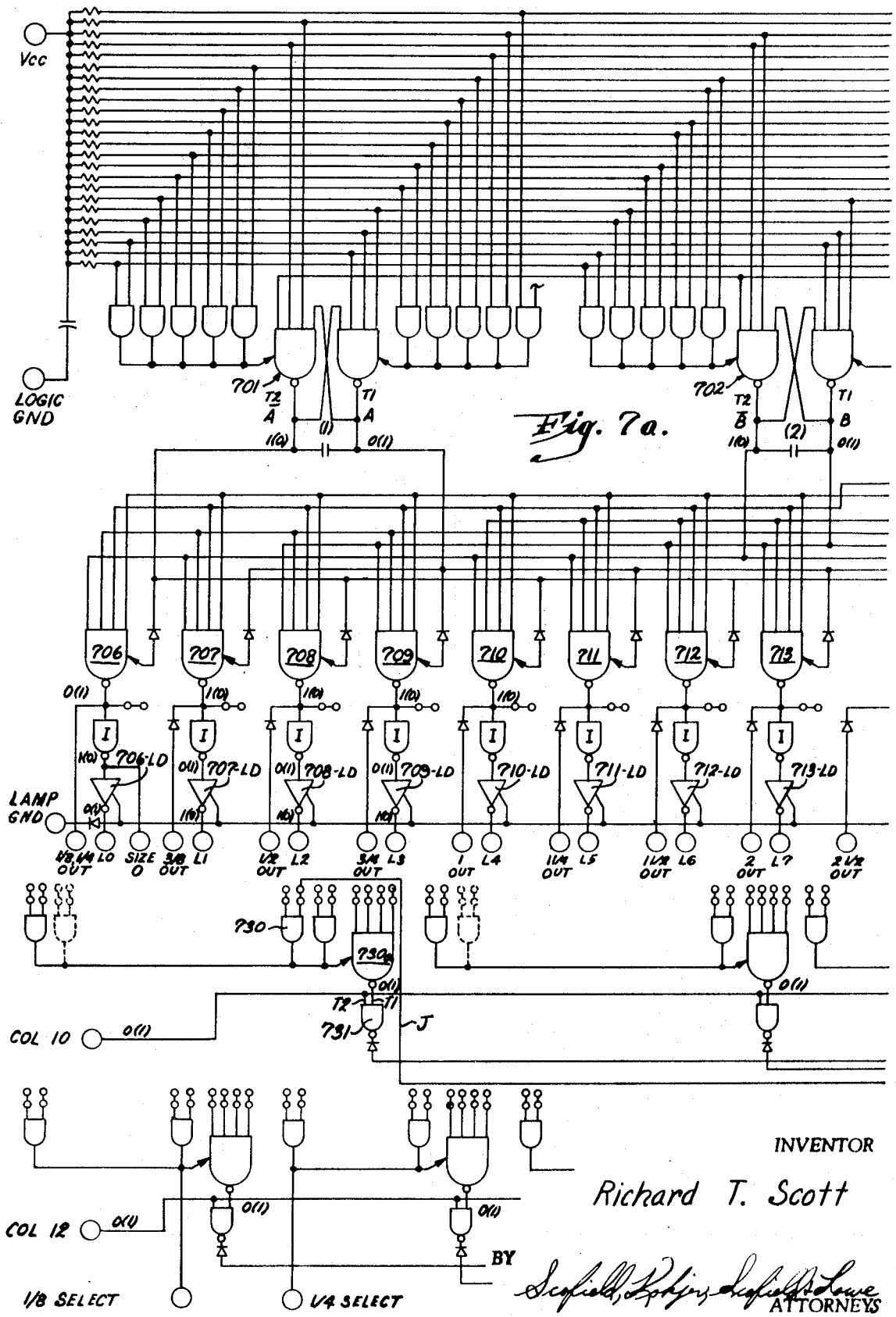
Figure 7B:
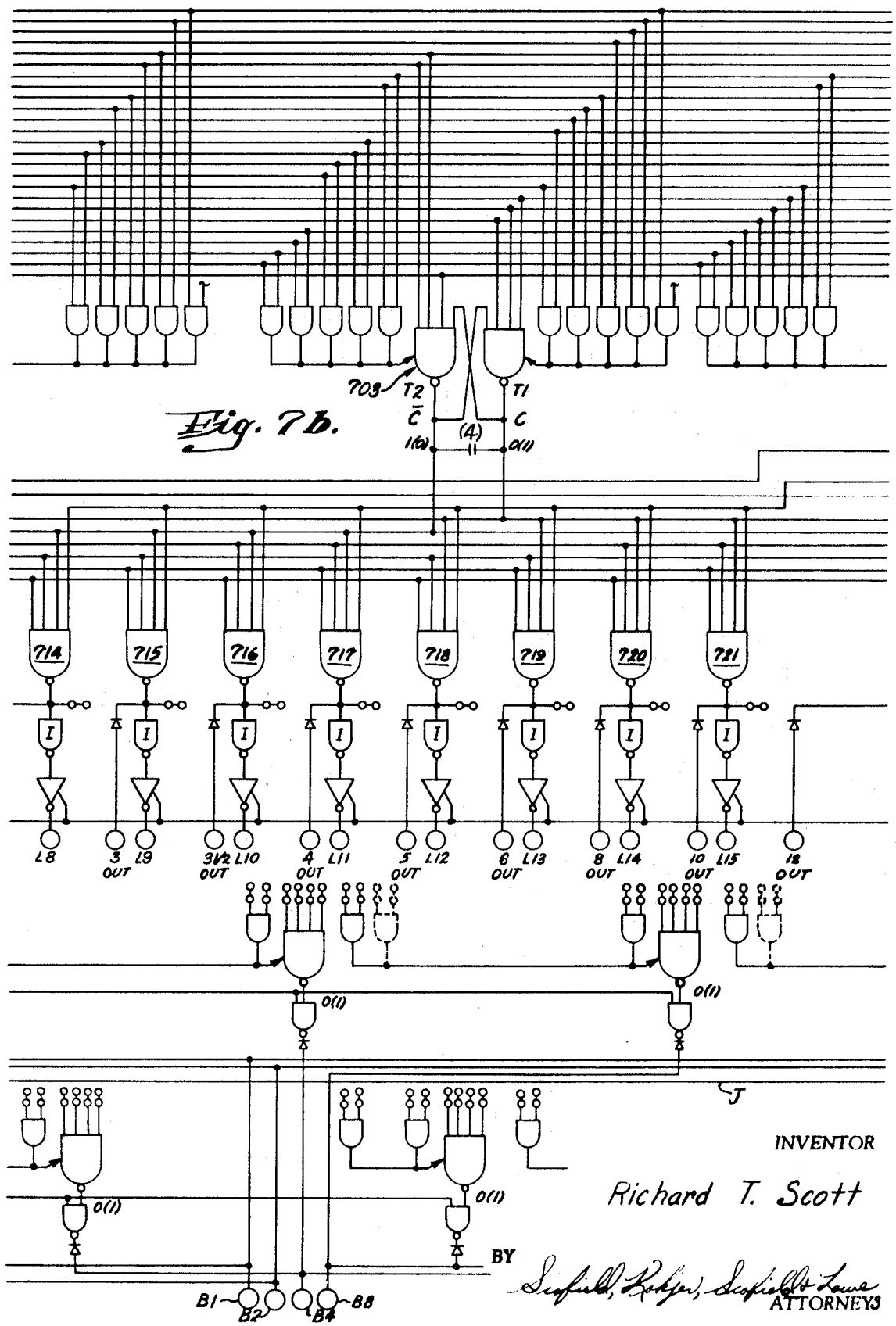
Figure 7C:
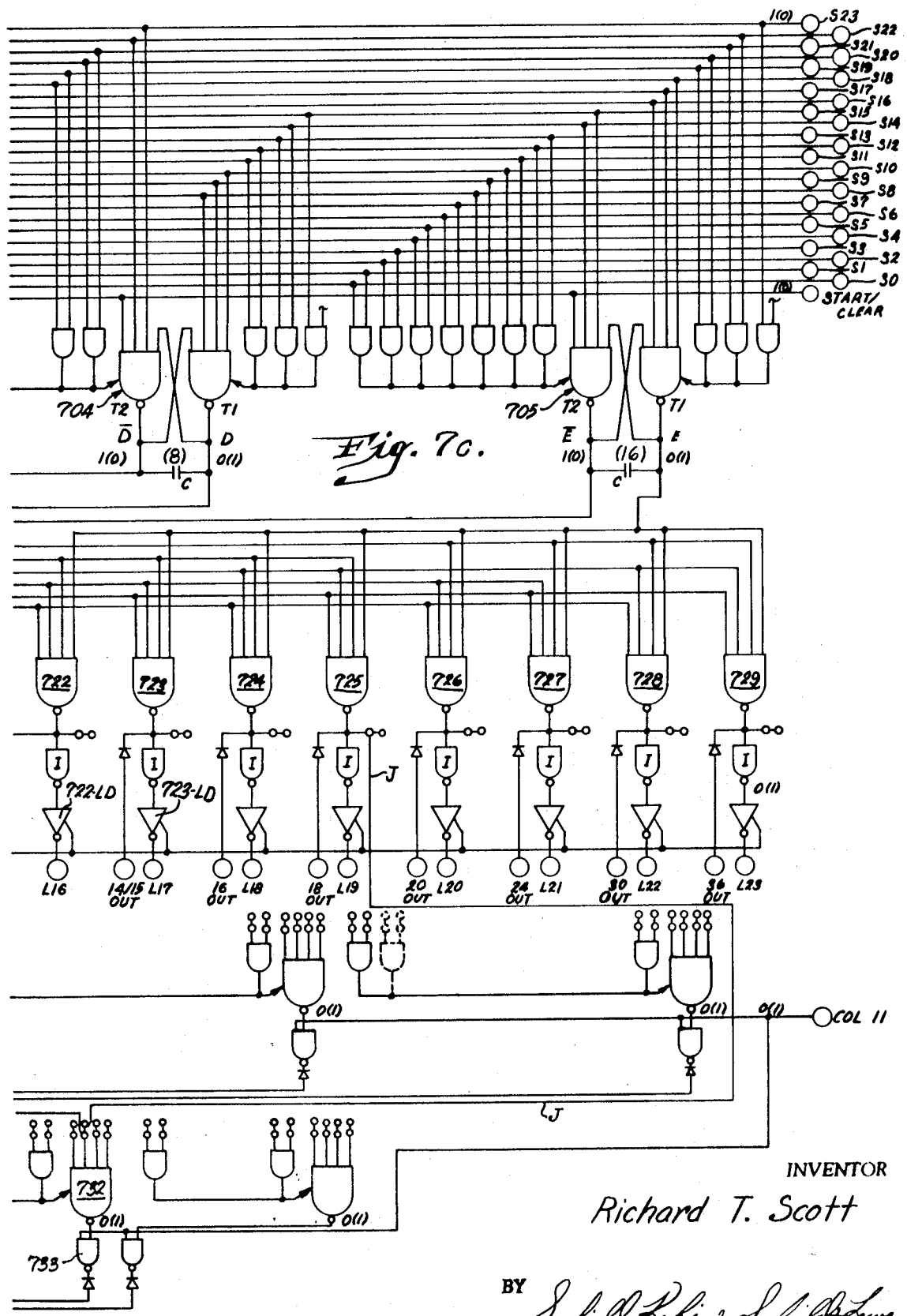
Figure 8A:
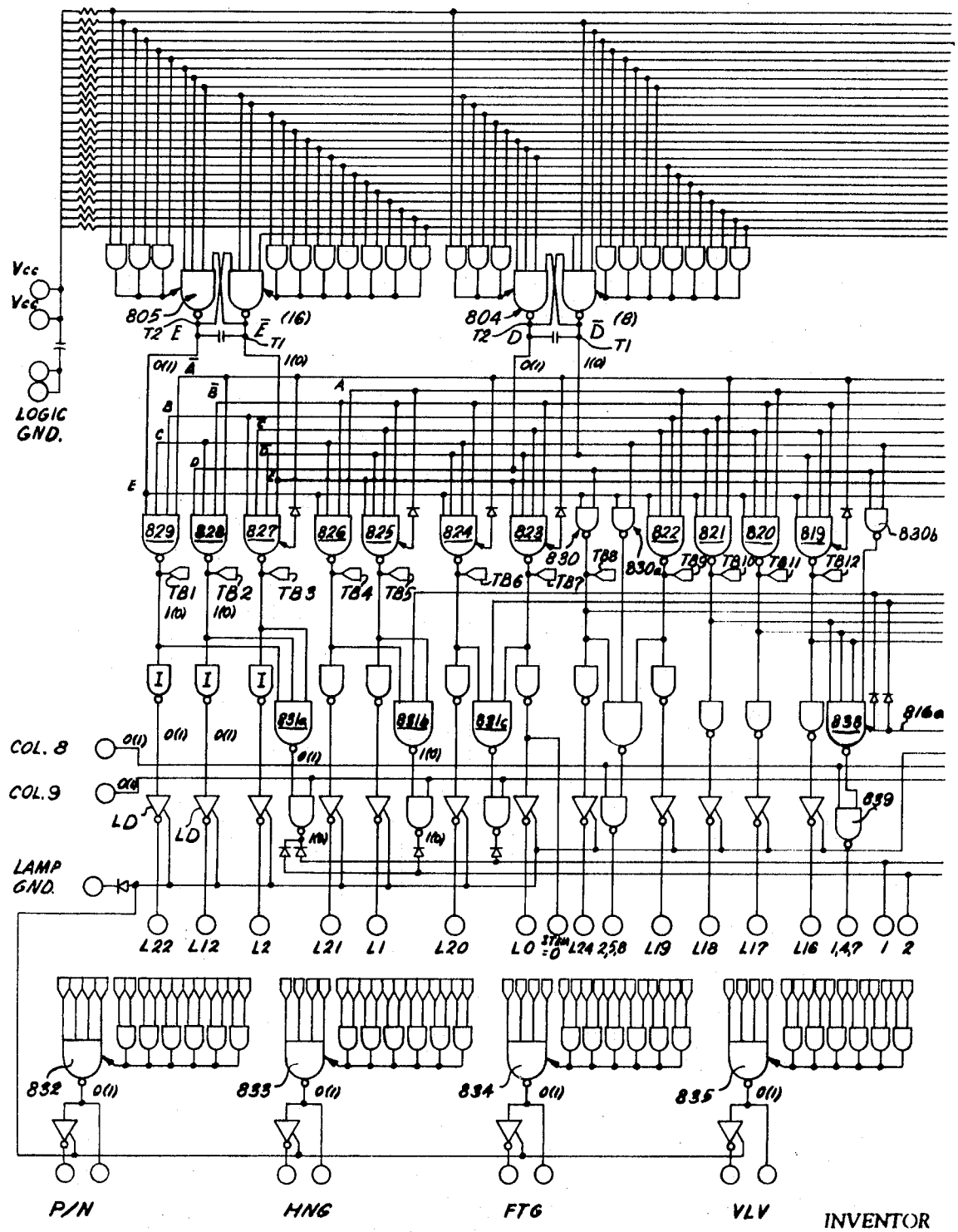
Figure 8B:
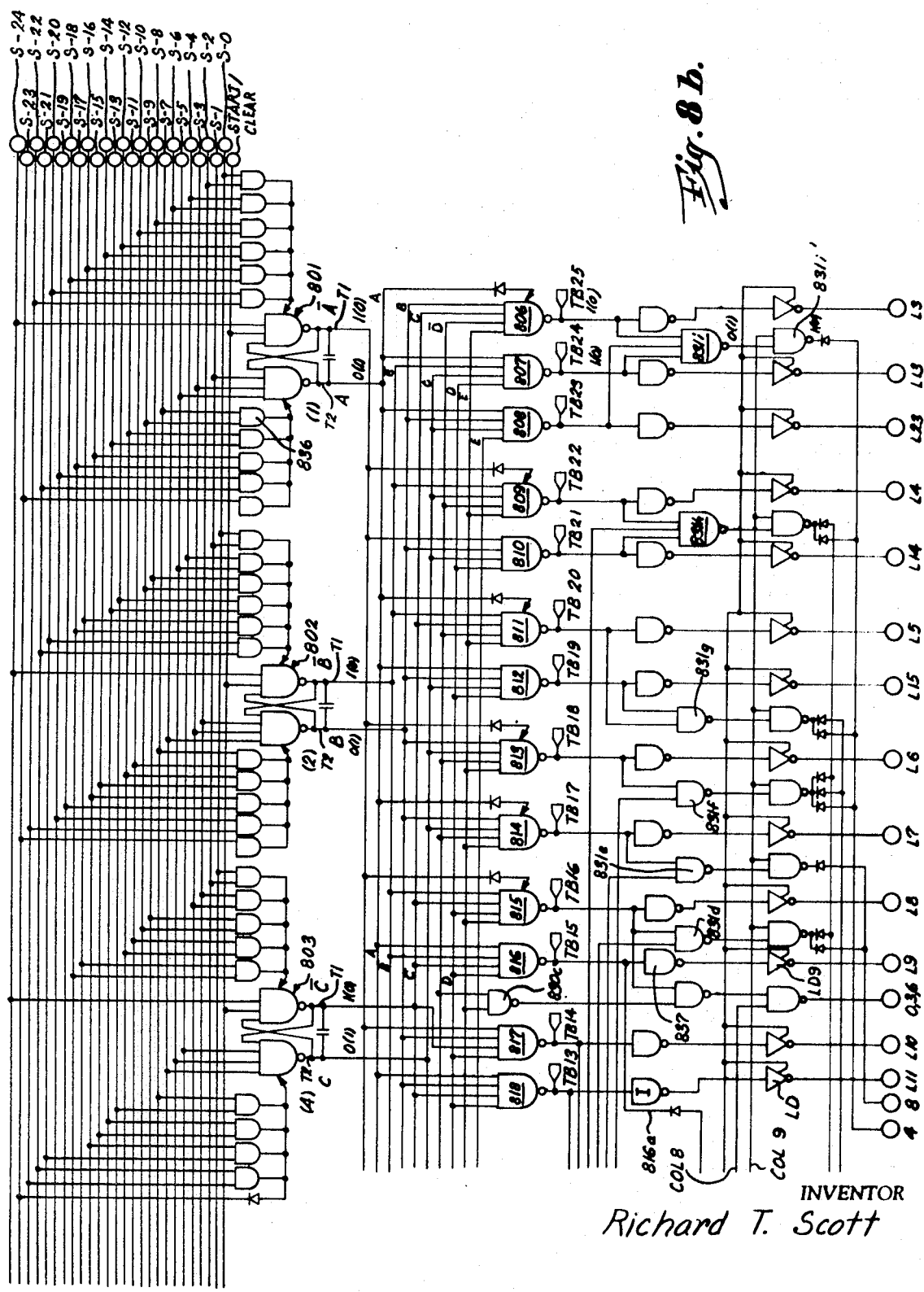

FIG. 2 is an orientation plot showing the proper figure arrangement to view the subject matter in FIGS. 1a and 1b; FIGS. 3, 4, 5, and 6; FIGS. 7a, 7b and 7c; FIGS. 8a and 8b; and FIGS. 9a and 9b;

FIG. 3 is a schematic circuit diagram of a portion of the control circuit board occupying the upper left-hand quadrant thereof;

FIG. 4 is a schematic circuit diagram of that portion of the control circuit board occupying the lower left quadrant thereof;

FIG. 5 is a schematic circuit diagram of that portion of the control circuit board occupying the upper right-hand quadrant thereof;

FIG. 6 is a schematic circuit diagram of that portion of the control circuit board occupying the lower right-hand quadrant thereof;

FIG. 7a is a schematic circuit diagram of the left one-third of the size circuit board;

FIG. 7b is a schematic circuit diagram of the middle third of the size circuit board;

FIG. 7c is a schematic circuit diagram of the right third of the size circuit board;

FIG. 8a is a schematic circuit diagram of the left-hand portion of the item circuit board;

FIG. 8b is a schematic circuit diagram of the right-hand portion of the item circuit board;

FIG. 9a is a schematic circuit diagram of the left-hand portion of the quantity circuit board;

FIG. 9b is a schematic circuit diagram of the right-hand portion of the quantity circuit board;

FIG. 9c is a waveform diagram.

Figure 10:
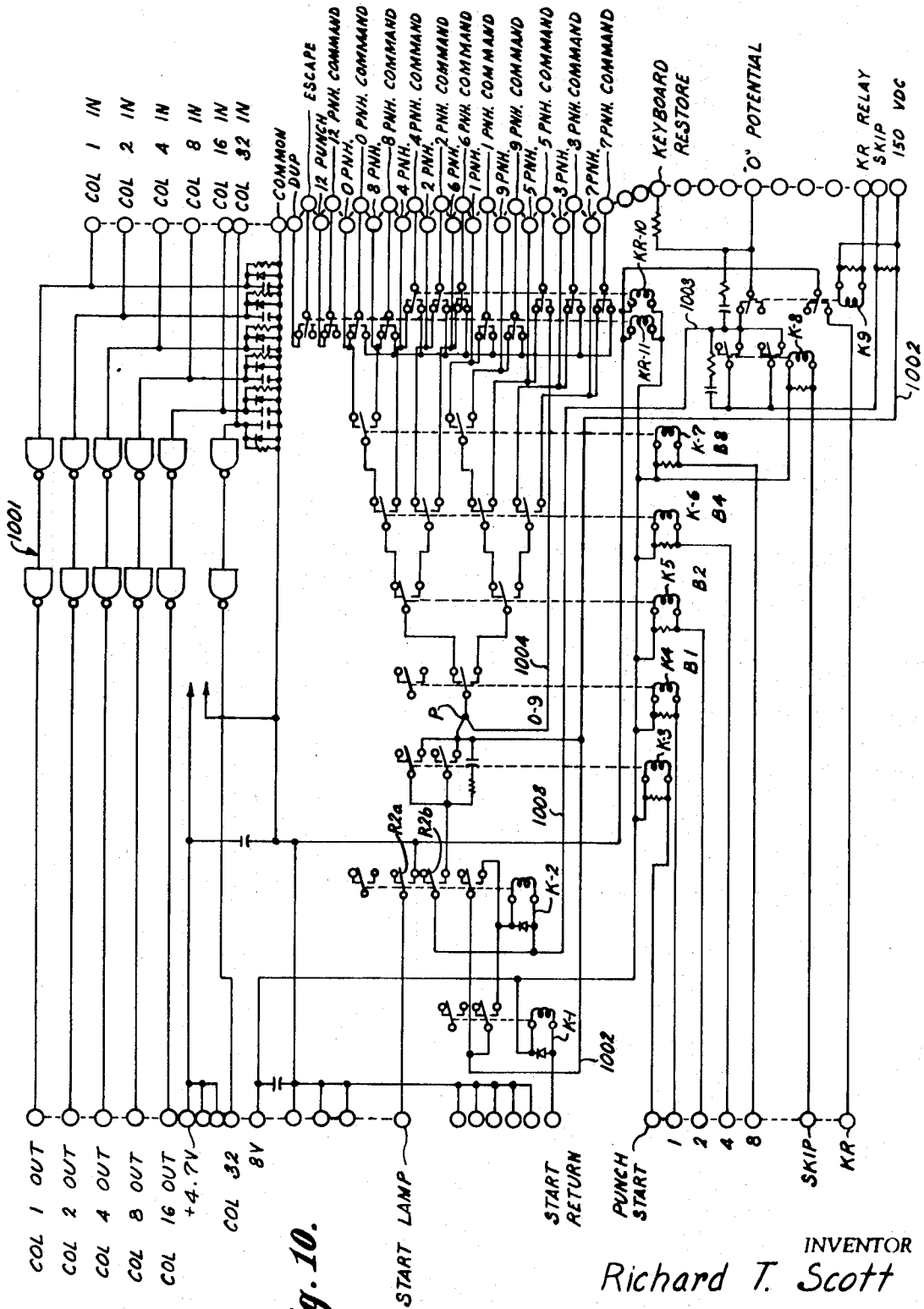

FIG. 10 is a schematic circuit diagram of the relay circuit board; and

FIG. 11 is an elevational view of the control panel of my estimating device with the power and program unit and card punch shown in block diagram form.

My basic estimating device and system is shown in FIG. 11 and includes the input control panel 1101, the power and program control 1102, and the card punch 1103.

The control panel has 24 code thumb wheel switches (generally indicated at the numeral 1104) with appropriate display windows arranged horizontally along the upper portion thereof. The first three switches (from left to right as seen in FIG. 11) are used to set the estimate number (shown as 025). The next two switches relate to the system number (shown as 02). Following the system number is the multiplier factor, a three digit number (shown as 001). Continuing on from left to right, the next 16 thumb wheel switches relate to material specification groups such as (1) valves, (2) fittings, (3) pipe and nipples and (4) hanger material. For example, the first group of four switches relate to the valves, same having a yellow indicating lamp 1104a centered above the first group. The next group of four switches relates to fittings and has a clear lamp 1104b associated therewith. The pipe and nipples and hanger material groups comprise the last eight switches respectively and likewise have a red lamp 1104c and a green lamp 1104d associated with each respective group. Each group (of four switches) is broken down into subgroups, there being the A group (comprising two left-hand switches in each group) for the smaller sizes and the B group then also (comprising two right-hand switches in each group) for the larger sizes.

Located directly under the thumb wheel switches and on the left-hand portion of the control panel are the group of eight Ditch Depth pushbuttons 1105 which are numbered 1, 2, 4, 6, 8, 10, 12 and 14. These pushbuttons have lamps associated therewith which will illuminate the particular button that is depressed. The button lamp is lighted after the memory of the estimating device has recorded the fact that the button has been depressed, and there is no direct connection between the button switch and the button lamp. As a result, the illumination of a particular lamp necessarily corresponds to that information which is being encoded.

Located directly below the Ditch Depth pushbuttons 1105 are the Size pushbuttons 1106 (there being three rows of eight pushbuttons with a different size [one-eighth–one-fourth, three-eighths, one-half, etc.] recorded on each pushbutton). These buttons 1106 likewise illuminate when depressed.

The Item pushbuttons 1107 (five rows of five buttons) are located directly below the Size pushbuttons and are of a slightly different structure; however they also are of the type that are capable of being illuminated when depressed. Associated with the Item pushbuttons is a mask 1107a which is easily removed from its button identifying position with item buttons 1107. In this manner, the mask may be changed and the Item pushbuttons utilized to identify other items rather than those shown in FIG. 11.

There are 24 Size Changeover toggle switches 1108 located on the upper right-hand portion of the control panel immediately below the thumb wheel switches. These switches are arranged in three rows of eight switches. A separate switch centered one-eighth–one-fourth is located above the upper row. These switches likewise are identified by the removable mask 1108a. A three position Range switch 1109 is located immediately to the right of Size Changeover switches 1108 and is shown as having three different positions (1-25, 31-55 and 61-85).

The control pushbuttons 1110 are located immediately below Size Changeover switches 1108 and the Range switch 1109 and are comprises of the A pushbutton, the Automatic (Aut) pushbutton, the B pushbutton, Add pushbutton, Subtract (Sub) pushbutton, Error pushbutton, and the Clear pushbutton.

A 10 key keyboard (0 through 9) for entering the quantity of a certain item is located in the lower right-hand portion of the control panel with a digital readout (shown as a three digit digital readout of NIXIE tubes). Finally, indicator lights D=0, Q and I are positioned on the panel between the Item pushbuttons and the 10 key keyboard and operate to signal certain conditions during the operation of the control unit.

The control panel is interconnected to the power and program control 1102 by cord 1102a. This power unit will also be connected to a conventional source of electrical power by the cord 1102b thereby appropriately connecting the estimating system for use once the power unit has been interconnected with the card punch and its associated switches turned on. It is important to note that the power unit has an On-Off switch and a Start button of the type which will be energized when depressed, and when the On-Off switch is depressed for the second time, it will return to its normally off position. On the right-hand side of the power unit is the 026 toggle switch which will be discussed in more detail *infra*.

As will be seen, the card punch is used as a terminating device of the estimating system and operates to strobe or interrogate the memory of the estimating device (the memory within the control panel) as well as to punch a card in the appropriate place upon commands by the estimating device.

Prior to utilizing my invention as an estimating device, it is generally necessary to perform certain preliminary steps, particularly if the terminating device used therewith is a card punch. In other words, the conventional card punch machine must be rendered compatible with the operation of the estimating machine. For instance, drum cards for the front and rear drums of the card punch must be prepared. The drum cards operate so that the front card will control the automatic operation of the card punch while the rear card contains a binary code which tells the estimating device which card column is ready for punching in the card or key punch. The card hopper must, of course, be filled with cards (these cards are to be prepunched with word marks if the computer reader on which they are to be processed requires same) and a card with "3's" punched in columns 1 through 21 should be placed in front of the deck of cards.

The card punch is now ready to be turned on and the estimating device electrically connected with the card punch as mentioned above. The "Auto Feed," "Auto Skip-Auto Dup" and "Print" switches should all be turned on. The rear program drum star wheels of the card punch may then be lowered when the drum is inserted in the machine, but the front drum star wheels must remain raised.

Assuming that the estimating device is to be utilized in the plumbing contracting business and that the operator (the person compiling data for estimating purposes) has read the material specification for the job, the operator may then go to a table of code numbers for the material specifications. As suggested above, it is convenient in this type of estimating to break down the material specifications into the following subgroups:
1. Valves,
2. Fittings,
3. Pipe and Nipples, and
4. Hanger Material.

The table of code numbers may then be set into the estimating device by the thumb code wheels mentioned above. For example, the estimate number, system number and multiplier thumb wheels are all manipulated so that the code number is shown in the appropriate window. In most piping systems, the subgroup parts are broken down into two material specifications, there being one for the small sizes and one for the larger sizes. The operator can then set the code wheels for the valves, fittings, pipe and nipples and hanger material to the specification number having the appropriate significance therefor. For instance, the specification number for valves of a small size are recorded by the two code wheel switches located to the left of and beneath the yellow specification selection lamp. The specification number for the large size valves is then set into a code wheel to the right and directly beneath yellow specification selection lamp 1104a. Similar settings are, of course, made for fittings A and B, pipe and nipples A and B and hanger material A and B. As a general rule, the multiplication factor mentioned above is set to 001.

The operator of the estimating device may then consider the three rows of eight switches located on the right-hand side of the control panel which was identified above as specification change toggle switches 1108. These switches program the estimating device to change from specification "A" to specification "B" at the size indicated by the operator. The operator, for instance, by setting the switches to their downward position, will cause their respective size buttons to record or indicate the selection of the larger size. Under normal conditions the operator will then set the upper centrally located toggle switch (having either a one-eighth or a one-fourth position) to the one-fourth position, since one-eighth sizes are rarely used.

The operator will then turn the card punch on. The E-026 switch (located on the the power panel) is set to the 026 position. The operator will then simultaneously depress the On-Off button and the Start button (also on the power unit). When the starting program has been completed, a light inside the start button will indicate the condition so that the operator may release same. The On-Off button will remain locked in the depressed condition until it is released by being pressed again.

The "release" button (not shown, but located on a conventional card punch) is depressed and released three times with the operator checking the card punch to make sure that the card with the "3's" punched through the first 2 columns is at the center or master station of the card bed. After checking this, the operator may then lower the front drum star wheels and press the back space button on the card punch to properly seat the star wheels and finally set the E-026 switch to the "E" position.

The operator may now direct his full attention to the control panel of the estimating device and, except in very special cases, once the code wheels are set, the operator need deal only with the control panel and input buttons thereon.

The item or part description controls, located in the lower left-hand corner of the control panel, have been arbitrarily labeled but must be made to agree with the written description on the corresponding price card for the specification numbers which have been set on the program panel by the code wheels. These buttons control the punching of columns 8 and 9 on an individual punch card in that by selective activation thereof the numbers 01 through 25 may be punched into these columns. When the operator depresses any one of the Item buttons, a lamp lights directly under the depressed button, thereby showing the operator that the estimating device has stored in its memory the fact that the button has been depressed. The same technique is used throughout the memories of the estimating device so that the operator can tell by looking at the control panel whether or not the proper information is stored.

When, under normal Item operating conditions (with the mask normally used), the range switch 1109 (located to the right of the specification change toggle switches) is normally set at 1–25. The other two settings (31–55 and 61–85) may be utilized under other special conditions.

Although the button designations shown in the Item section of the control panel are arbitrary, care must be taken in order to put similar types of material in locations which are wired for similar types of material. The buttons labeled "Nipples" and "Pipe" always cause the punching of the pipe and nipple specification in the 13th and 14th columns of the card. Similarly, the first four buttons (left to right) of the fourth row of buttons always punch the valve specifications numbers into the 13th and 14th columns, and the clamp, sleeve and hanger buttons always punch the hanger specification number. All other buttons punch the fitting specification number. Any arrangement of nomenclature on the Item keyboard which conforms to this wired program will allow a computer to properly process the cards.

An example of a possible variation on the nomenclature would be a system in which there are no valves but a number of unusual types of fittings. In this case, the valve descriptions could be removed from the fourth row and the additional suitable nomenclature placed in same. The valve specification numbers could be set to numbers which are identical to the fitting specification numbers and the items which are numbered 16 through 19 could be used for fittings rather than valves. (The only variations on nomenclature which cannot be used is one in which the prewired program groups are split into two dissimilar subgroups of material. However, the operator may change the prewired program if he so desires).

Turning now to the Size pushbuttons 1105, the operator can press an appropriate size button which describes the size of the material which is to be recorded. Under normal circumstances, these three rows (of eight buttons each) will include all sizes in the material specification. If, however, the system includes sizes which are not on the keyboard, it is generally found that the smaller sizes are not included and it is entirely feasible that the top row of pushbuttons could arbitrarily be used for the unlisted sizes. Also, it is sometimes just as easy to manually record and list the sizes which are not located on a particular key. It should, however, be noted that the listed sizes will be printed and punched in the 10th 11th and 12th columns of the punch card in a one place decimal form (for example three-eighths is punched as 003; three-fourths as 007; 2½ as 025; and 36 as 360).

The single row of pushbuttons located immediately above the Size buttons are normally used to indicate the depth of the ditch in which the pipe is to be placed. For instance, when the Item pushbutton labeled pipe is depressed and a number 4 is depressed in the Ditch Depth row of pushbuttons, a Ditch Depth of 04 is punched into the 6th and 7th columns of the punched card. The Ditch Depth information may be used as a separate run on the computer to determine the amount of excavation required on the estimate. This may be accomplished by multiplying the ditch width, calculated from the pipe size, by the Ditch Depth and the quantity of pipe presented in the quantity section of the punch card. The Ditch Depth punch buttons 1105 can also be used to modify the size part of the descriptive information when referring to elements such as reducing tees, concentric reducers and eccentric reducers or any other reducing fittings.

The Ditch Depth buttons are programmed in such a way that they must be depressed after all other descriptive information is set into the control panel. Each time either an Item or Size button is depressed, the Ditch Depth memory is set to 0. This condition is indicated by the top window located immediately left of the 10-key numerical input buttons and is conveniently labeled D=0.

A brief review of the above indicates that the punch card in the card punch machine is waiting at column 1 for instructions from the control panel to punch out the following descriptive information: estimate number; system number; item number; size code; Ditch Depth (or reducing fitting code); and specification number. The operator will now utilize the quantity keyboard to insert the quantity of the items which he has described via utilization of the above-mentioned pushbuttons.

Obviously, the first thing that the operator must do is to determine whether the quantity is to be added to or subtracted from the quantities of like material which have been recorded in the past. Under normal circumstances, quantity will be added, however at certain times (such as when a system is modified) it may be necessary to subtract portions from the old system. When this is necessary, the operator may depress the "SUB" button (located below the size changeover switches) causing the computer to subtract the quantity represented on the punched card from the previously accumulated total. In this way, the operator is freed from the task of going through a mountainous pile of punch cards to remove the cards which were punched at a previous time. For example, if the operator depresses the "ADD" button, a 1 will be punched in column 15 of the card, but if the "SUB" button is depressed, a 2 will be punched in this column of the card. The operator may now depress the appropriate 10-key quantity input buttons to indicate the 14 of units of material which have been described and which are required for a minute subsection of the system. When the quantity is inserted, the amount which is recorded in the memory will be displayed in the 3 window digital readout located above the 10-key input buttons and the lamp inside the "register Clear button" will be extinguished thereby indicating that a quantity is stored in the register.

With the above-mentioned quantity being inserted in the appropriate memory, the device will now signal the card punch to punch out the columns 1 through 14 which contain all of the descriptive information. While the descriptive information is being punched, the lamp behind the window labeled I (for Item) on the control panel will be extinguished and at the same time the power to all of the pushbuttons on the left side of the panel will be interrupted so that the memory cannot be jammed by operator's trying to insert descriptive material into the memory while the memory is causing the printing out of the punched card.

It should be pointed out that the operator now has displayed before him, the information which will be punched into a single card by the card punch. Stated another way, the operator may examine the lamps which have been lighted on the control panel and see which Ditch Depth, Size and Item buttons have been recorded in the memory. Of course, the quantity is displayed on the digital readout and, if all of the variables properly check out, the operator may then begin the insertion of the information for the next *item* to be recorded. As soon as one of the item, size or Ditch Depth buttons is depressed by the operator, the quantity from the previous description will be punched into the punch card which has been waiting at column 15 for a signal to proceed. Assuming, that the device is operating in a normal mode, column 15 will be punched with a 1 to indicate an additive quantity. Columns 16, 17 and 18 will contain the quantity information and columns 19, 20 and 21 will contain a multiplication factor which, in normal operation, will be 001.

During the time that the quantity information is being punched by the card punch, the lamp behind the window indicating quantity will be extinguished and no quantity information can be changed during this time interval. After the quantity information is punched into the card, the card punch stops at column 22 of the card and the estimating device acts to clear the Quantity register (set the register equal to 0). As soon as the register is cleared, the unit instructs the card punch to place a new card into the punching station.

The 5 pushbuttons on the control panel which have not yet been discussed in any detail are the A, Automatic, B, Error and Clear buttons. These buttons (located above the digital readout) modify the program of the device so that the operator does not have to go to the card punch nor the code wheels for any reason except to put more cards into the card punch or to change the multiplication factor on the code wheels.

The A, Automatic and B buttons are used to automatically select between the specification numbers for small size parts and large size parts or to override this automatic feature. Your will recall that the Size Changeover switches located immediately above, are set up to determine which parts are to be considered large or small. If, for some reason, it is necessary to have a large part with a small part specification number, or vice versa, the operator may immediately, before inserting the size or item, depress either the A or B button to lock the automatic specification selection system to the A or the B position. When the operator depresses the A or B button, the lamp under the automatic button is extinguished and the lamp under either the A or B is lighted. The operator may then insert a description and quantity of items which have a fixed specification irrespective of size. When the operator wishes to return to the automatic mode of specification selection, he depresses the Automatic button which will relight the lamp under same and at the same time, the lamp under A or B button will be lighted, depending upon which size has been selected and stored in the size memory.

The Clear button is used to clear the register if the operator happens to insert an erroneous quantity in the numerical register. This button, like the 10-key quantity input buttons, is inoperative during the time when the quantity is being punched into the card.

The last remaining button on the control panel is the Error button. This button is used when all the information is displayed on the control panel as a means to cancel same after the information has been checked. When the information is displayed on the control panel, the first 14 columns of information have been punched into the card and, if the operator finds that he has inserted the wrong descriptive information and after he has inserted the quantity, he may then depress the Error button. The correct descriptive information may then be appropriately indicated which causes the punching of columns 15 through 21 in the punch card. The fact that the Error button has been depressed is indicted on the control panel by a lamp behind the Error button and is indicated on the punch card by the punching of the number 3 in the column 15. The 3 indicates to the computer that the card is in error and should be disregarded in compiling the total of like parts. When the card punch gets to column 22, the fact that the Error button has been depressed bypasses the clearing of the register and causes the card punch to insert a new card into the punching station.

Since the register was not clear (as mentioned above), a quantity stored in the register causes the immediate punching of the first 14 of the new card. The new card will record the correct descriptive information since the operator has already made the correction prior to the time that the last columns of the previous cards were punched. The card punch will, therefore, come to a rest at column 14 with the correct descriptive information punched into the new card and the correct quantity stored in the register. The error function is released by the estimating device during the time when the new card was inserted in the punching stations so the operator may now select the next item which is to be recorded and columns 15 through 21 will be punched in the card now at the punching station. Column 15 will contain the code for add or subtract (whichever the case may be) and the remaining columns will show the correct quantity for the corrected item. The estimating device now operates in its normal mode and punching continues under the normal program.

There are times when a subassembly drawing, shown on the plans used by the operator for estimating purposes, indicates that these subassemblies are repeated throughout the system. Accordingly, the multiply factor may be utilized. If, for instance, a subassembly is repeated 20 times throughout the system, the operator may set the multiplication factor wheel at 020 after having inserted the description of the first item of the subassembly but before inserting the description of the second item of the subassembly. He may return to the normal mode of multiplying by 001 by resetting the multiplication factor to 001 after having inserted the first description of the first item not in the subassembly but before having inserted the description of the second item shown in the subassembly.

The switch labeled "E-026" locks up the keyboard of the card punch at times when the estimating device is being used to insert all of the information to be punched into the card in the card punch. This prevents erroneous information from being punched into the cards by someone mischievously playing with the keyboard.

It must be remembered that it is possible to install the program and power unit for the estimating device and the card punch in a location remote from the operator of the control panel. If the card punch keyboard is to be used for miscellaneous punching while the estimating device is attached to the card punch, the E-026 switch must be placed in the 026 position, and the estimating device must be turned off. The "Start" button on the power supply and program panel (1102) is illuminated by a relay which is held in by power from the card punch. If the power of the card punch is momentarily or permanently interrupted, the lamp in the "Start" button will be extinguished and at the same time the circuit which triggers the punching of cards will be broken. The operator can recognize this condition from the control panel because the Quantity and Item lamps will not extinguish and the register will not clear automatically, thereby indicating that a card is stalled in the card punch. If this condition should occur, the operator may go to the card punch and remove the card which is undoubtedly garbled due to the power failure.

Depression of the "Start" button will reset the register to 0, the Ditch Depth to 0, the size to one-eighth–one-fourth and the item to the upper left-hand button of the group 1107. When this has been done and the card punch is in column 1, with power established, the lamp under the "Start" button will relight. The operator must then restart the card punch as described above, repunch the garbled card, and continue with his normal sequence of operation.

The quantity register is programmed in such a way that zeros will be printed in the unused columns of the punched card and the operator inserts a quantity into the register in the way he would insert a quantity into any other calculating or adding machine. When the operator has recorded the last quantity, a card will remain at the punching station with only the first 14 columns punched. In order to complete the punching of this card, the operator must depress any Size or Item button. The operator should now raise the front star wheels of the keypunch and take the unused cards from the feed hopper. The estimating device can now be turned off and the E-026 switch set to the 026 position. The release button on the card punch may then be depressed three times to clear all of the cards out of the card bed of the card punch. The operator can now punch out a system description card.

Preparation of this card (description card) is governed by the computer system being used to process the cards, so no details will be given here as to the specifics of the card. The cards can now be taken from the card stacker on the card punch. The top card should be removed and saved for the next run, but the face that it is punched with "3's" will prevent it from affecting the computer if it is accidentally left with the deck. Likewise, the last two cards in the deck should be removed. Since most card punches are built in such a way that they will lock up if a card with holes (the 3's mentioned above) in the columns which are to be punched at the punching station is not present at the master station, this function is used to advantage by the estimating device since each card is checked as it passes through the master station to insure that a malfunction in the estimating device is not deleting the punching of one of the columns. The lock up function of the card punch makes it necessary, however, to have a "dummy" card at the front of the deck, so that the first item card can be punched. The card with "3's" is used because the computer is instructed to disregard any card with a 3 punched in the 15th column.

Before turning to a more detailed description of the circuitry utilized in my device, a brief review of the basic logic circuitry used throughout same will facilitate a complete understanding thereof.

A JK flip-flop consists of two flip-flops, the first of which is set by the incoming lines as the clock pulse or shift pulse goes from 0 potential to the binary 1 potential, the second flip-flop is set from the first flip-flop when the clock pulse goes from 1 to 0, the second flip-flop is connected to the output lines of the JK flip-flop. Therefore, if a number of JK flip-flops are connected together, each will read the output of the preceding flip-flop as the clock pulse is entered and each will set its own output to match the output of the preceding flip-flop as the clock pulse is removed.

The basic logic circuit used in my estimating device is a NAND/NOR gate. By definition, the output of such a gate will be the binary complement of the input and the gate can be used in either the NAND or NOR function. If one wishes to use the gate in the NAND function, meaning that the inputs must all be true to give a false output, the binary 1 level must be used for the input, therefore if all inputs are at the 1 level, the output will go to the 0 level. If the gate is used in the NOR function, then the 0 binary level must be used to represent the true condition at the input, hence if any input goes to the 0 potential, the output will be at the 1 potential. Any number of input lines may be used up to the maximum allowable for the circuit, that is to say that a NAND gate which has 4 input leads available can be used where only 3 are required, and in Boolean algebra terms the function of the gate would read "not output is equal to input 1 and input 2 and input 3."

Many of the illustrated gates also use an extender input so that more inputs can be tied together through diodes to increase the number of functions which are required to be true in order to get a 0 output. It is important to remember that these circuits are built in such a way that the designer has the choice between considering the 0 binary level and the 1 binary level as the true status of a given function. For this reason it is sometimes necessary to invert the binary level which is to be considered true. This can be done using an inverter gate with only one input. The output of the gate will then be the complement of the input. Since having any input at the 0 binary level will produce a one binary output and since there is only one input, a 1 binary potential input will produce a 0 level output. By having any function available with the 0 binary level or the 1 binary level equal to the function being true, it is possible to combine the various gates to produce NAND or NOR logic functions.

Also, a flip-flop can be constructed very readily by cross connecting the input of one gate to the output of another gate and the output of the second gate back to the input of the first. For example, if these gates are referred to as "A" and "B," if "A" has a 0 output it must necessarily have a 1 input, and "B" having a 0 input will have a 1 output. If 0 potential pulse is applied to the input of "A," it will allow the output to go to the 1 potential. Since no input is present, at the "B" gate other than the output of "A," the output of "B" will then go to the 0 potential and lock the input of "A" to the 0 potential. On certain of the flip-flops shown in the registers, a capacitor has been tied between the output of "A" and the output of "B." This capacitor serves the function of damping or slowing down on the flip-flop action and is required because of the extremely high speed of the gates. If it were not for this capacitor, spurious noise generated by the card punch would cause the flip-flops to oscillate erratically.

The other basic circuits are the relay drivers and lamp drivers which utilize a transistor circuit capable of being driven by the output of the logic circuitry and at the same time capable of carrying enough current to switch a lamp or relay to the on or off position. The relays shown in the drawings are used to switch functions within the card punch or terminating device, or to interface from the terminating device to the logic of the estimating device. For instance, I utilize JK flip-flops in the Quantity Circuit Board (FIGS. 9a and 9b).

The principal operating circuitry of my device may be functionally described as being comprised of the Ditch Depth circuit board, the Quantity circuit board, the Control circuit board, the Item circuit board, the Size circuit board and the Relay circuit board. For convenience in manufacturing and assembly, each of the above-mentioned functions has been related to a circuit board (all of the boards except the relay circuit board which is located in the power unit 1102 are conveniently mounted within the control panel module).

Since the functional operation of several of the circuits are somewhat similar, the Ditch Depth circuit board will be discussed first because it is less detailed in both structure and operation. FIGS. 1a and 1b (with FIG. 1a to be oriented above FIG. 1b) show the circuitry of the Ditch Depth board.

Turning now more particularly to FIG. 1a, the upper left hand portion of this figure discloses the various inputs and biasing potentials which are or may be applied to the Ditch Depth circuit board. These inputs include the $V_{cc}$ positive bias, the logic ground, the start-clear input, and eight inputs which are labeled S-1 through S-8. It will be seen that the S-1 through S-8 inputs respectively correspond to the eight Ditch Depth pushbuttons which are labeled pushbuttons 1, 2, 4, 6, 8, 10, 12 and 14 (see FIG. 11).

These above-mentioned inputs are connected as shown in FIG. 1 to a four level binary flip-flop register which has been designated, from right to left, by numbers 101, 102, 103 and 104. These flip-flops are assigned the binary bit designations of (1), (2), (4) and (8), respectively. Although there are only eight Ditch Depth pushbuttons, the depression of the Start button or any of the Item or Size buttons will set the Ditch Depth register to the clear or 0 position, thereby making it imperative that the four level binary flip-flop register is capable of remembering nine possible states of Ditch Depth information.

The above-mentioned register is interconnected so that when the register is storing in the 0 position, all of the flip-flops (101, 102, 103 and 104) are reset so that the terminal RS on each flip-flop is in the 1 binary potential state. The input lines to the flip-flops act in the NOR logic function so that when a given button is depressed, for example switch S-5, the various flip-flops will be set to represent the number of the switch in *binary* form.

The circuit connections from switch input S-5 to the four level binary flip-flop register are such (note the connections to the left-hand gates of flip-flops 101 and 103) that when the Ditch Depth pushbutton 8 is depressed the 8 bit binary (104) is reset, the 4 binary bit flip-flop (103) is set, the 2 binary bit flip-flop (102) is reset, and the 1 binary bit flip-flop (101) is set. Accordingly, the binary equivalent of the decimal number 5 is recorded. Quite obviously, any of the Ditch Depth switch inputs having other designated numbers (see FIG. 11) may be recorded on the four level binary register (in a similar manner). Of course, the Start-clear switch may be used to reset all of the flip-flops comprising said register at an appropriate time.

The capacitors C which are tied across the output of the two gates of each flip-flop operate to prevent the spurious setting or resetting of the flip-flop by noise generated in the card punch.

As further seen in FIG. 1, there are a series of nine NAND gates which are appropriately wired to the Ditch Depth registers (flip-flops 101–104) so that each one of said NAND gates represents one of the nine possible states of the Ditch Depth memory. The condition of these gates, numbered from right to left, 105 through 113, are an indication of which switch depression (switch input energization) is stored in the flip-flop at the present time.

Again referring to switch input S-5, the condition of NAND-gate 110 indicates that a S-5 input is being stored. This is done by Nanding together the binary bits 4 and 1 and not 2 (the not functions will hereinafter be represented as the function with a line over same, i.e. a not 2 will be shown as $\overline{2}$). As the output of the S-5 NAND gate (110) goes to 0 potential, lamp 5 (designated as L5 in FIG. 1b) is illuminated through the inverter gate 114 and the lamp driver LD-5 via line 115a. NAND-gate 110 is also connected through a series of (factory installed) jumpers and via line 115b to NOR-gate 116 (FIG. 1b). The output of NOR-gate 116 is connected to the input of NAND-gate 117 so that the binary bit 8 (note the 8 terminal in FIG. 1b) will be driven when the (COL. 7) driver line is high. Since the fifth switch from the left on the control panel (see FIG. 11) encodes the number 08, there is no connection to a NAND gate for the (COL. 6) input and COL. 6 will therefore generate the number 0. The other switches representative of the Ditch Depth buttons 1, 2, 4, 6, 10, 12 and 14 operate in a similar manner with respect to the COL. 6 and COL. 7 driver lines to appropriately record the selected number in Columns 6 and 7 of the punch card.

The use of the above-mentioned jumpers between the nine Nand gates (105–113) which represent the nine possible states of the Ditch Depth memory and the binary coded decimal (BCD) output of the Ditch Depth circuit board allows a simple factory revision of this printed circuit board by installation of different jumpers to allow the eight Ditch Depth buttons to generate and punch eight two digit numbers desired. Furthermore, it should be obvious from the above discussion that lamps L0, L1, L2, L3, L4, L6, L7 and L8 corresponding to switch numbers D=0 1, 2, 4, 6, 10, 12 and 14, respectively, are lighted in a similar manner through identical circuitry as that described above with respect to lamps L5, the number 8 Ditch Depth switch. Furthermore, the other binary bits (4, 2 and 1) are appropriately interconnected with the COL. 6 and COL. 7 input lines through appropriate inverter circuits so that any needed combination of same may be readily obtained in a similar manner.

Size Circuit Board

The size circuit board (shown in FIGS. 7a, 7b and 7c) is similar in structure and operation to the Ditch Depth circuit board (FIGS. 1a and 1b) except that since there are 24 possible states in the size memory, therefore five flip-flops are required instead of the four on the Ditch Depth circuit board. In this regard, flip-flop 701 (reading from left to right) is the binary 1 flip-flop; flip-flop 702 the 2 flip-flop, flip-flop 703 is the 4 flip-flop; flip-flop 704 the 8 flip-flop; and flip-flop 705 the 16 flip-flop. The principle of operation of these flip-flops is again similar to that discussed with respect to the Ditch Depth circuit board *supra*, in that the inputs to all the flip-flops are held in the high position by connecting them through resistors (see FIGS. 7 and 8) to the $V_{cc}$ supply positive voltage. When a button is depressed (represented by the switch terminals S-0 through S-23 in the upper right hand corner of FIG. 7c and by the start-clear line shown therein) the line connected to the depressed button terminal is grounded and connected through one of the various OR gates to set the flip-flops in the appropriate position to remember which button has been depressed. It should be noted that the first pushbutton position generates a 0 in the size memory, however the set and reset positions in this memory are reversed with respect to those discussed in conjunction with the Ditch Depth circuit board. Stated another way, when a given flip-flop among the register flip-flops labeled 701 through 705 (from left to right) is not representing the binary 1 state, the flip-flop terminal T2 is at the 1 level rather than the terminal T1. In addition, the flip-flops are assigned the binary bit designations 1, 2, 4, 8 and 16 from left to right rather than directionally vice versa. As in the Ditch Depth memory, capacitor C is tied across the various flip-flops to prevent spurious setting and resetting of these flip-flops by noise which may be generated by the card punch.

Each of the 24 possible states of the size memory is represented by one of the 24 NAND gates identified by the numerals 706 through 729. Each of these NAND gates in turn has its output inverted through an inverter I before being applied to its respective lamp driver (706LD–729LD), same being capable of energizing a lamp located within the Size pushbutton which has been depressed. The output lines from each NAND gate also have a terminal which may be interconnected with suitable jumpers to allow the punching of any three digit number desired. For example, note the jumper line connection with NAND-gate 725 (se the lower portion of FIGS. 7a, 7b and 7c) designated as J which interconnects same with OR-gate 730. As a result, the output of gate 725 is in turn gated and inverted through gates 730 and 730a so that a 1 condition is delivered to terminal T1 of the input of NAND-gate 731. When the COL. 10 line is also high the high condition on terminal T1 is Nanded with the high condition on terminal T2 of NAND-gate 731, thereby driving the binary 1 terminal (see B1 on FIG. 7b) which is interconnected with the relay driver on the control circuit board (FIGS. 3, 4, 5 and 6) to cause the card punch to punch a number one in the column 10 position.

It should be noted that the NAND-gate 725 is the 20th gate from the left-hand side, therefore corresponding to the 20th Size pushbutton which represents the numeral 18 (see FIG. 11). As a result, the three digit number 180 will be punched in the columns 10, 11 and 12 of the punch card. Since column 10 is the first considered column, only the binary number 1 will be Nanded with the COL. 10 line at this particular time through the jumper as mentioned above. Obviously, the COL. 11 line needs to be Nanded with the necessary jumpered NAND gates to produce a binary 8 output for the purpose of punching same in the card. This is accomplished by the interconnecting of jumper J with NOR-gate 732 (see FIG. 7c). The output of this NOR gate will be Nanded with the COL. 11 line in NAND-gate 733 which drives the binary 8 (see on FIG. 7b) high thereby resulting in the punching of the number 8 in the 11 column of the punch card. Since the last number of the three digit number (180) is 0, the column 12 line NOR gates are not jumper connected with any of the above-mentioned NAND gates (706–729) so that the sequential operation of the device with respect to COL. 12 results in the number 0 being punched in column 12 of the punch card. It should also be understood that for purposes of convenience, the fractional outputs such as the three-fourths out will be punched in the card as 007, therefore necessitating the proper jumpering of the above discussed OR and NAND gates to drive the decoding relays to punch 007 in the 10, 11 and 12 columns of the punch card, respectively.

As mentioned above, the COL. 10, 11 and 12 indicator lines are Nanded together with the outputs of the NAND gates (706 through 729) to properly and sequentially feed the binary coded decimal output to the decoding relays and to in turn punch the correct decimal numeric representation in each column. In addition, the lamp outputs from the 24 NAND gates (706 through 729) represent the individual states of the flip-flop memory. Also, the output terminals from the various NAND gates are labeled (from left to right on FIG. 7a: one-eighth, one-fourth out; three-eighths out; one-half out, etc.) and feed the specification select system switches so that when the spec select switch for a given size is turned on and the button is depressed, a 0 potential will be found at the common output of the size changeover portion of the spec select system.

Item Circuit Board

The Item circuit board is shown on FIGS. 8a and 8b and is similar to the organization and operation of the size and Ditch Depth circuit boards discussed above. As shown in FIG. 8b, there are 25 pushbutton terminals represented by the numeral S-0 through S-24 plus the start/clear terminal. (It should be noted that there were only 24 pushbutton switches associated with the size circuit board). Five flip-flops, 801 through 805, are still, however, required to record the 25 possible states of the input information. These flip-flops 801–805 have outputs represented as A, Ā; B, B̄; C, C̄; D, D̄; and E, Ē, respectively. Also, the flip-flops 801–805 have been assigned the binary bit designation of 1, 2, 4, 8 and 16, respectively.

The item flip-flops are somewhat different in that they represent a binary 0 when the right-hand terminals thereof are at the 1 potential. Thus the 1 potential is representative of the NOT condition. Like the size and Ditch Depth flip-flops, the item flip-flops (801–805) are fed by the plurality of OR gates which decode the 25 input lines into the 25 binary states of the flip-flops. Like the size register, the upper left button on the Item input board sets flip-flops 801–805 to the 0 position.

NAND-gates 806 through 830 are interconnected with the outputs of the various flip-flops so that the 25 possible states of the memory from the binary coded decimal, number 0 through 24, may be remembered. The 25th state of the item memory is represented by the NAND-gate 830 (see FIG. 8a) when same is energized. The other three NAND-gates, 830a, 830b and 830c and associated circuits are also located in the memory register and are utilized to indicate the decade represented in the memory register. The outputs of these circuits are conditioned by the three position rotary switch (1109) on the control panel so that one of these gates (830a, and associated circuits) can represent the decade from 0 through 9, 30 through 39, or 60 through 69. The second of said gates (830b and associated circuits) can represent 10 through 19, 40 through 49, and 70 through 79 while the third such gate (830c and associated circuits) can represent 20 through 29, 50 through 59, and 80 through 89.

The 25 possible states of the memory register are usable to perform three different functions. For example, each NAND gate has an inverter I and a lamp driver LD associated therewith for the purpose of energizing the light located in each pushbutton. As shown along the lower portion of FIG. 8b and above the tabs in FIG. 8a, lamp drivers LD are interconnected with the numbered lamp terminals so that, for example, the output of NAND-gate 829 results in the illuminating of a lamp associated with switch terminal 22. Similarly, NAND-gate 828 will cause the illumination of a lamp associated with switch terminal 12, etc.

The states of the memory register (NAND-gates 806–830) are also directed to a plurality of NOR-gates 831a, 831b, 831c, 831d, 831e, 831f, 831g, 831h and 831i, which encode the right-hand digit of the item number.

In this regard, the outputs of the NOR-gates 831a–831i are all Nanded with the COL. 9 input line so that the output terminals (shown as 1 and 2 on FIG. 8a and as 4 and 8 on FIG. 8b) may be appropriately combined (in a manner similar to that mentioned above) to produce any decimal numbers 0–9 in column 9 of the punch card. It should be noted that these output terminals (1, 2, 4 and 8) are utilized on the control circuit board to insure the proper encoding of the right-hand digit of the punch card's columns 8 and 9 after the appropriate decade or left-hand digit has been punched in column 8.

A typical example of the production of a decimal 4 in the right-hand column may be seen by observing the NAND-gates 806, 807 and 808. The outputs of these gates are NORED in NOR-gate 831i. The output of gate 831i is then Nanded with the COL. 9 indicator line in NAND-gate 831i to energize the terminal 4 (see the lower left-hand portion of FIG. 8b). Of course, the output of the other NOR gates (831a–831i) may be used to produce the various other decimal numbers.

The third function may be seen with reference to the tabs in FIGS. 8a and 8b wherein a tab is connected directly below the output terminal of each of the NAND-gates 806 through 829. These tabs can be connected by field inserted jumpers to the four spec select status gates 832, 833, 834, and 835 (FIG. 8a). Connecting the jumper between an appropriate tab tb–1–25 on the output of any one of the 25 possible memory gates and the input of one of the four possible specification select status gates allows the correct spec select lamp to be energized and an appropriate terminal shifted from the binary 0 to the binary 1 potential whenever the appropriate button is depressed. It is significant to note that each of the 25 buttons is connected to one of the four specification select status gates (832 through 835) through the field inserted jumpers so that each item of material falls into one of the four possible material specification classifications. The remainder of the spec select system has a control function associated therewith and will be discussed in regard to the control circuit board, infra.

As suggested above, the item circuit board works in conjunction with the appropriate pushbuttons on the control panel of the estimating device. If for example, button 9 (this button actually producing the output of decimal 10) were depressed, the output of button 9 is connected to a terminal located in the upper right-hand corner of FIG. 8b and labeled S-9. The The energizing of this terminal (by depressing of the button 9) sets the 801 flip-flop (the binary 1 flip-flop) through the OR-gate 836. That is to say, the terminal T1 will be at the binary 0 position while the terminal T2 will be at the binary 1 position. Following on down through the flip-flop register, the binary 2 bit (flip-flop 802) would be reset with its terminal T2 at 0 potential. The binary 4 bit (flip-flop 803) would be reset, with its terminal T1 at the 1 potential. The binary 8 bit (flip-flop 804) would be set with its terminal T2 at the 1 potential while the binary 16 bit (flip-flop 805) would be reset with its terminal T2 at 0 potential. Therefore, the following lines would at 1 potential: A, B̄, C̄, D and Ē.

Again, it should be remembered that the pushbutton and lamp numbers as well as the number represented in binary form within the memory, start numbering with 0 so that the gate connected to the lamp 9 is the 11th gate from the right-hand portion of FIG. 8b or gate 816. This gate is acting as a NAND gate so that when all the input lines thereto are at binary 1 potential the output is 0 potential. As shown, the input lines are connected to the A, B̄, C̄ and D outputs from the above-mentioned flip-flop register. The input is not connected to Ē since the E flip-flop (flip-flop 805) is always in the 0 position whenever a 9 is represented. This is because the sum of 9 and 16 is 25 and with the numbering within the memory starting at 0, 25 would represent the nonexistant 26th memory status condition. Obviously then, it is not necessary to gate the Ē function into the gate representing the binary 9 within the memory.

From the above, it has been established that by depressing pushbutton 9 the various flip-flops are set and reset so that NAND-gate 816 has a 0 potential at its output. The inverter 837 raises the lamp driver LD-9 input to a binary 1 potential, same energizing the lamp 9 shown at the bottom of FIG. 8b. At the same time, the output terminal of NAND-gate 816 is connected by the field inserted jumper to one of the specification select inputs thereby allowing the OR function of the specification select gate to energize one of the specification select indicator lamps and to energize a line (FIG. 8a) indicating the status of the spec select system to the portion of the spec select system which is on the control circuit board discussed later.

Since the decimal output of the item register is 10 when the number 9 button has been depressed and the binary 9 is represented in the item memory, there is no connection between the output of the 9 button NAND gate (816) and the 1, 2, 4 and 8 binary output lines which are enabled conjointly with COL. 9 indicator line. This is because the right-hand number of the decimal output is a 0. Stated another way, the pushbutton 9 equals the decimal output 10 therefore no connections are needed to the COL. 9 line. However, the output terminal of NAND-gate 816 is connected to NOR-gate 838 via line 816a (see FIG. 8a). The output of NOR-gate 838 is Nanded together with the COL. 8 line in NAND-gate 839 thereby feeding the 1, 4 or 7 output line. This line is conditioned by the rotary switch 1109 to punch either a 1, 4 or 7 in the left-hand portion of the two digit output number (the two digit number to be punched in column 8 and 9 of the cards). Thusly, since it is desired that the decimal output 10 be punched in the appropriate columns, the COL. 8 Nanding with the circuitry from the 9 switch results in a 1 being punched in the 8th column if the rotary switch is in the 1–25 position and since the circuitry from the 9 switch is not connected with COL. 9 a 0 will be punched in the 9th column of the punch card.

Quantity Circuit Board

The quantity circuit board is shown on FIGS. 9a and 9b and makes use of J-K flip-flops as a quantity register to store a 3 digit decimal number in binary coded decimal form to represent the 1, 2, 4 and 8 binary values for each digit.

The Quantity 10-key input keyboard is connected to the terminals S-0 through S-9 in FIG. 9a. When any of the keyboard buttons are depressed, the 0 potential is disconnected from the terminal labeled quantity-enter and the 0 potential is applied, through the illustrated isolating diode, to the upper gate of the "quantity shift and enter pulse generator" flip-flop 901 via line 901a. In the absence of the 0 potential being applied to terminal T2 of flip-flop 901, a 0 potential is normally on terminal T1 so that the output terminal of the lower gate of this flip-flop is normally at binary 1 potential. The manipulation of any one of the pushbuttons (S-0 through S-9) causes this normal condition to be reversed thereby dropping the terminal T2 to a 0 potential (through the diode connection to the button switch terminal) so that the output terminal of the upper gate of flip-flop 901 goes to the binary 1 position. The purpose of this flip-flop is to cause a sharp delineation between the condition of a button being depressed and it not being depressed. Furthermore, contact noise in the keyboard pushbuttons would cause a number of shift and enter pulses to be generated if the flip-flop were not present. Also, it is important to note that this flip-flop is normally held in the off position (e.g. with the output terminal of the upper gate at 0 potential) when the buttons are not being depressed since the quantity-enter terminal is connected with the input terminal T1 and held at ground potential.

When any one of the buttons (S-0 through S-9) is depressed, the output terminal of flip-flop 901 goes to 1 potential as shown in the waveform diagram (FIG. 9c), the wave or voltage block has its leading edge shifted at various points throughout the "shift and enter pulse generator." It should be note that at the point A, the leading edge of the voltage block goes from 0 to 1 rather slowly because the presence of capacitor C1. This delay is the time which the gate 902 allows its output to go from 1 to 0 potential. The gate 903 acts as a simple inverter so that at point C a second capacitor C2 further delays the pulse as shown in FIG. 9c. The gate 904 is used as a NAND gate to generate a short 0 potential pulse at point E which is inverted through gate 905 and at the NAND-gate 906 before being delivered (through an inverter) to the J-K flip-flops, discussed *infra*. This pulse will serve as a shift pulse when the shift pulse reaches the clock pulse terminals (CP) of the various J-K flip-flops. When the shift pulse reaches the clock pulse terminals of the various flip-flops, each flip-flop reads the status of the terminals T1 and T2 (at their respective inputs) during the rise time of this pulse. These terminals (T1 and T2) are connected to the equivalent binary bit of the lower order decimal digit and read the lower order's value. As the shift pulse decays, the amount which has been read from the lower order digit is shifted to the output terminals of the flip-flop thereby accomplishing this shift.

Returning once again to the pulse shaping network, capacitor C3 at point G causes a delay in the gating of the pulse thereat through gate 907 through point H, a similar capacitor C4 at point K causes the delay in gating at point L.

The enter pulse is derived in the manner similar to the shift pulse i.e. by the gating of two pulses which are delayed with respect to one another together in NAND-gate 908 with the output of same being inverted and fed back to the clock pulse terminals of the units digit J-K flip-flops (flip-flops 1, 2, 3, and 4) via line 909a. The pulse is also fed, via line 909b, to NAND-gates 910a, 910b, 910c and 910d.

The combination of the clock pulse terminals CP, mentioned above, and the NAND gates (910a, 910b, 910c and 910d) allow the units register to be set to a value determined by which one of the 10-key input pushbuttons has been depressed. If for example, the pushbutton 5 (labeled as S5 in FIG. 9a) is depressed, the binary bits 1 and 4 of the units register are set. This is accomplished by gating the signal on the switch S5 terminal through OR-gates 911a and 911c, (OR-gates 911a, 911b, 911c and 911d interconnect with the input of NAND-gates 910a, 910b, 910c and 910d, respectively) through NAND-gates 910a and 910c respectively and finally through associated inverters I to the terminals T3 of the units J-K flip-flops 1 and 3, respectively. It should be pointed out that the binary order of the flip-flops are arranged so that the 1 flip-flop is the binary bit 1, the 2 flip-flop is the binary bit 2, the 3 flip-flop is the binary bit 4, and the 4 flip-flop is the binary bit 8. The 10's flip-flops 5, 6, 7 and 8 are similarly serially arranged as are the hundreds flip-flops 9, 10, 11 and 12 to correspond to the binary bits 1, 2, 4 and 8, respectively. Also, there is a slight difference between the connections of the units digit flip-flops and in the 10's and 100's flip-flops in that the terminal's T3 of the 10's and 100's digit flip-flops are grounded so that these flip-flops may take the state as determined by the input on terminals T2 and T1.

In the units digit flip-flops (1, 2, 3 and 4) the terminals T1 are connected to supply voltage Vcc through appropriate resistors which sets this terminal to a constant binary 1. Terminals T2 are grounded therefore setting same to a constant binary 0. When this is done, the enabling clock pulse (at terminals CP) allows each flip-flop to go to a 1 or 0 position as determined by the input on terminals T3.

Since it is, in theory, possible to accidentally depress any one of the pushbuttons one time too many (the fourth time) and thusly shift the most significant digit out of the 100's register, an inhibit shift circuit 912 (FIG. 9b) is appropriately interconnected to preclude further shifting after the 100's digit register is loaded (having a significant digit loaded therein). The above inhibiting function is accomplished by the use of the NOR gate 912 and the feeding back of the output of same to each flip-flop's input. That is to say, when the 100's digit represents the number 0, the $\bar{A}, \bar{B}, \bar{C}$ and $\bar{D}$ lines (on the 100's register) will be at the binary 1 level. If any number other than 0 is entered into the hundred register, at least one of these lines will go to the binary 0 level. This will cause the output terminal of the NOR-gate 912 to go to the binary 1 potential which is fed back via line 912a to the input terminal of inverter 913. This circuit (913) inverts the level and produces a 0 potential at the output thereof which is delivered to the NAND-gate 906. If a 0 potential is applied to the input of the NAND-gate 906, the shift pulse will not be allowed to pass therethrough thereby inhibiting the shift function of the subject registers.

As suggested above, the flip-flop number 1 of the units register has an output $\bar{A}$ which corresponds to the binary bit 1, flip-flop 2 has an output on the $\bar{B}$ which corresponds to binary bit 2, flip-flop 3 has an output on the $\bar{C}$ which corresponds to the binary bit 4, and flip-flop 4 has an output on the $\bar{D}$ which corresponds to the binary bit 8. The 10's and 100's registers are similarly arranged from the lower to the higher order of same so that the $\bar{A}, \bar{B}, \bar{C}$ and $\bar{D}$ output lines respectively correspond to the 1, 2, 4 and 8 binary bits. As seen in both FIGS. 9a and 9b, there are three sets of 4 terminals, one set being the output terminals for the units register (shown in FIG. 9a) one for the 10's register, and the final set for the 100's register (the 10's and 100's shown in FIG. 9b). Each one of the three sets of 4 terminals is a 4 level binary coded decimal output which is connected to a BCD to decimal Nixie tube driver (manufactured by the Transistor Electronics Corporation of Minneapolis, Minnesota). The Nixie tubes in turn indicate, in decimal form what is stored in each register, with same visually appearing on the control panel of the estimating device.

A set of 12 NAND gates identified as 914a, 914b, 914c and 914d (the unit NAND gates); 915a through 915d, (the 10's NAND gates); and 916a, through 916d, (the 100's NAND gates) are connected with their respective digit registers to NAND the binary coded decimal (BCD) outputs from each digit with the correct column indicator line (COL. 16, COL. 17, and COL. 18). Each of the three digits are connected in essentially the same manner except that the COL. 16 is connected to the hundreds digit output, COL. 17 is connected to the 10's digit output and COL. 18 is connected to the units digit output.

For example, the number 123 indicating a quantity of one hundred twenty-three particular items is set on the 10-key keyboard (located on the control panel) by first depressing the 1 key, then the 2 key and finally the 3 key. The 1 binary bit will be stored in the 100's register, the 2 binary bit stored in the 10's register and the 1 and 2 binary bits stored in the units register for proper sequential strobing by the terminating device and Nanding with COL. 16, COL. 17 and COL. 18 in the 914 NAND gate, 915 NAND gates and the 916 NAND gates. With the 1 stored in the 100's register, the A output will be high from the flip-flop 9 so that a high condition on COL. 16 is Nanded through NAND-gate 916a with the 1 terminal shown at the lower right-hand portion in FIG. 9a being energized. The 2 condition in the 10's register will be represented by a binary 1 on the B terminal of flip-flop 6 in that register so that same will be Nanded with the COL. 17 indicator line in NAND-gate 915 thereby appropriately energizing terminal 2 to result in the punching of a decimal 2 in column 17 of the punch card. The 3 in the units register will be indicated by the presence of a 1 condition on the A terminal of flip-flop 1 and a 1 condition on terminal B of flip-flop 2 in the units register. This results in both NAND-gates 914a and 914b be Nanded with the COL. 18 output lines so that both terminals 1 and 2 cause the appropriate punching of a decimal 3 in column 18 of the card.

Control Circuit Board

The control circuit board is illustrated in FIGS. 3, 4, 5 and 6. This circuit maintains the logic necessary for the control of my estimating device and this circuit board contains a number of miscellaneous circuits which will be discussed, *infra*.

As seen in the right-hand portion of FIG. 5, a plurality of terminals are marked COL. 1, COL. 2, COL. 4, COL. 8 and COL. 16. These terminals are interconnected with the terminating device (card punch, on line computer etc.) so that the terminating device may interrogate my estimating device. The interrogating functions, which are sequentially conducted, also cause certain control functions within my device to operate. As will be seen, the input from the terminating device (terminals COL. 1 etc.) is directed through a plurality of noise filters and inverters, shown within the broken lines in FIG. 5 and identified by the letter F, before being directed to a 5 level binary to decimal converter or decoding system which comprises substantially the upper portions of FIG. 3 and FIG. 5.

The above-mentioned binary to decimal decoder is comprised of a plurality of gates operating in the NAND mode which combine the correct binary bit functions or the complement of bit functions to generate 22 discrete decimal outputs which have been labeled COL. 1 through 22 and either emanate directly from one of the converter NAND gates labeled 301 through 322 or through an associated inverter circuit I as shown in FIGS. 3 and 5. A decimal COL. 0 is also available at the output of gate 300, however, same is not used in the following example. Each of the COL. indicator lines is connected to a register (or some other input status storage device) in such a way that when the terminating device strobes (interrogates) the binary input lines in sequence, the output lines of the estimating device indicate what is stored in the memory in sequence with the strobing (interrogating) of the binary input lines.

Besides the COL. 1-16 inputs shown on FIG. 5, there are additional terminals which sense the conditions within the terminating device. For instance, a terminal labeled COL. 32 (somewhat of a misnomer since this line is not connected to the binary to decimal decoder but is referred to as COL. 32 since this would be the next binary bit of input lines) operates to turn a special function within the estimating device on and off and as a result may be thought of as a special function input line. The terminal labeled Initiate Start is connected to a button on the remote power unit 1102 (FIG. 11) rather than to the terminating device and said button must be depressed by the operator to start my estimating device after the power is turned on. The terminal labeled keyboard restore (corresponds to the card punch function called keyboard restore) is connected through a relay circuit from the terminating device which notifies my estimating device when the first digit of information or the 15th digit of information, skip command or special function digit of information has been received by the terminating device. The remaining terminals (of this group in the right-hand portion of FIG. 5) are supply voltages from the remote unit to the control panel or local unit.

There are four circuits located on the control circuit board (FIGS. 3, 4, 5 and 6) which do not have true control functions. The first of the now to be discussed circuits is located in the right-hand portion of FIG. 6 and contain circuit elements identified by the symbol RD. These circuits are an interface (relay drivers) between the integrated circuit output and the relays (discussed later) which feed the terminating device. Actually, this interface is comprised of the 4 level binary relay drivers represented by the triangular shaped symbols which are of a conventional design and are merely used as a device with sufficient gain to switch relays while being driven from the low current integrated circuit outputs.

The second system located on the control circuit board which does not truly have a control function is the specification select system (herein after referred to as spec select) shown on FIG. 3. This system is comprised of 16 NAND gates labeled 323 through 338 and interconnected with (see the left-hand portion of FIG. 3) the 4 input terminals from the Item circuit board, pipe and nipples (P/N), valves (VLV), fittings (FTG), and hanger material (HNG). As mentioned above, relative to the Item circuit board, each of the states of the item memory may be connected by jumpers to one of the four specification status output lines. Each of these four lines is used as one input to four of the NAND gates in the spec select system. Additionally, the COL. 13 and 14 indicator lines are each connected to eight different NAND gates in the spec select system and a line (either the A or B line shown entering FIG. 3 at the right-hand portion thereof), indicating whether spec A or spec B has been chosen by the size changeover portion of the spec select system, is gated through these NAND gates. Therefore, spec A is connected to eight of the gates and spec B is connected to the remaining eight. Furthermore, it will be seen that the specific combination of spec A, spec B, one of the four item specification status lines and one of the column indicator lines COL. 13 or COL. 14 will enable one of the NAND gates. The output of the enabled NAND gate (one of the gates 323-338) is fed through its appropriate specification code number wheel 1104 so that the number represented on the face of the wheel is encoded in a 4 level binary fashion. This encoded output is then fed back to the high threshold relay drivers (RD) shown in FIG. 6.

For an example of how the specific combination of SPEC A, spec B, one of the four item specification status lines and one of the column indicator lines (COL. 13 or COL. 14 ) will enable one of the NAND-gates 323 through 338, it may be seen in FIG. 3 that the valve (VLV) input terminal is connected to NAND-gates 331 through 334. (The pipe and nipple input terminal is connected to NAND-gates 335 through 338, the fitting input terminal is connected to NAND-gates 327 through 330 and the hanger input terminals connected to NAND-gates 323 through 326). NAND-gate 331 will be enabled by the 1 condition appearing on the valve input terminal, the spec A line, and the COL. 14 indicator line. The other NAND gates will be similarly enabled depending upon the conditions of the above-mentioned variable inputs thereto.

The A, Automatic and B specification select system (from which the A and B lines in FIG. 3, mentioned above, emanate) is shown in FIG. 6 and is located directly to the left of the relay drivers (RD) on the control printed circuit board. The circuit includes the A switch terminal, the Automatic switch terminal, the B switch terminal and a single A terminal. The A switch, (A sw) with its associated positive bias Vcc is connected to both the A flip-flop (identified as A.F.F.) and the B flip-flop (identified as B.F.F.) via T5 input. Likewise, the B switch (B sw) interconnects the B.F.F. and to one of the inputs (T6) to the right-hand gate of the A flip-flop. The Automatic switch (Auto sw) is similarly connected to the right-hand gates of both the A and the B flip-flop via the input terminals T5 of each flip-flop. For convenience of illustration and the following discussion, both the left-hand output terminals of the two flip-flops (A.F.F. and B.F.F.) have been labeled T1 while the outputs of the right-hand gate have been labeled T2.

In operation, when the Automatic switch (Auto sw) has been depressed or when my estimating device has been started under the normal starting sequence, the A flip-flop (A.F.F.) has a 0 potential input on either input terminals T3 or T4 of the right-hand gate thereof, thusly causing terminal T2 to go to a 1 potential. At the same time, the B flip-flop has a 0 potential being applied to either one (or both) of its two input terminals T3 or T4 on its right-hand gate thereof, thereby causing its output terminal T2 to go to the binary 1 potential. Accordingly, with the right hand or T2 terminal output of each flip-flop set to the 1 potential, the automatic size changeover is engaged. Further in this regard, the terminal labeled A is connected to the output of the automatic size changeover system. As mentioned above, the size changeover may be accomplished by connecting each of the 24 possible states of the size memory to terminal A through a set of 24 toggle switches. It should be further understood that at any time one of the toggle switches, which is turned on or set to spec A position, has its corresponding size loaded into the size memory, the terminal A will go to a 0 potential. With terminal A at 0 potential, the high threshold inverter 601 has its output set to 1 potential and eventually applying same to the input terminal T1 of NAND-gate 602. This NAND gate Nands together the A function and the Automatic function. The Automatic function being the 1 potential output on the terminals T2 of the B flip-flop and the A flip-flop, with both outputs being applied to the input of the NAND-gate 602 via its input terminals T2 and T3, respectively. The output of NAND-gate 602 is then applied to NOR-gate 603 which, through lamp driver LD-A turns on lamp A and energizes the line A.

If instead of the A spec, a B spec is indicated by the size changeover switch matrix, the terminal A (input to inverter 601) is at a 1 potential causing the inverter to go to 0 thereby turning off NAND-gate 602 (no output on terminal T4 of gate 602). However, the output of the high threshold inverter 601 is simultaneously fed through a second inverter gate 605 which opens (turns on) NAND-gate 606 (there being 1 potential applied to input terminal T1 and T2 of gate 606 from the B and A flip-flops, respectively). With NAND-gate 606 turned on, its output terminal T4 is directed to NOR-gate 607 which, via lamp driver LD-B, energizes lamp B and line B which also goes to the remainder of the spec select system.

Alternatively, if the A override button (A sw) is depressed, 0 potential is applied to the left-hand gate of the A flip-flop and to the right-hand gate of the B flip-flop via input terminals 5 at each gate. This causes terminal T2 of the A flip-flop to go to a 0 potential and likewise a terminal T2 of the B flip-flop to go to 1. Either one of these 0 outputs (on T2 of A.F.F. and B.F.F.) closes the NAND-gatses 602 and 606 for automatic spec selection. Furthermore, the 0 potential at T2 of the A flip-flop allows NOR-gate 603 to be energized, lamp A to be turned on and the A spec line to the remainder of the spec select system to be energized as mentioned above.

If the B switch is depressed, 0 potential is applied to the left-hand gate of the B flip-flop (terminal T6) and to the right-hand gate of the A flip-flop (terminal T6) causing the terminal T2 of the B flip-flop to go to a 0 potential. As a result, the input terminal T1 of NOR-gate 607 will be at a 0 potential also. Terminal T2 on the B flip-flop closes both automatic NAND gates (602 and 606) and causes terminal T2 of the A NOR-gate 603 to be at 1 potential thereby extinguishing lamp A and deenergizing line A to the rest of the spec select system. However, the terminal T2 (of the B flip-flop) being at 0 potential opens the B NOR gate (via T1, the input terminal on gate 607) causing lamp B to be illuminated and the line B to be energized.

As further shown in FIG. 6, the automatic lamp driver, LD-Auto, is a discrete component NAND circuit interconnected at its input terminals with the output terminals T2 of both the A and the B flip-flops. Accordingly, if either the A NOR-gate 603 or the B NOR-gate 607 has a 0 input thereto, the automatic light (auto light) is turned off, otherwise it will be illuminated.

The Add-Subtract flip-flop 513 (see FIG. 5) is also located on the control printed circuit board, however, like the spec select circuitry, it does not specifically perform a control function. This flip-flop operates to simply remember whether the Add or Subtract button has been depressed. For example, when the Add button is depressed, the terminal T1 of the left-hand gate of the Add-Subtract flip-flop goes to 0 potential. This 0 potential is fed through NOR-gate gate 501 and thence to NAND-gate 502. NAND-gate 502 Nands the COL. 15 (from gate 315 on FIG. 3) with the add signal to cause punching of the numeral 1 in column 15 of the card in the card punch.

If the Subtract button is depressed, the terminal T2 (the output terminal of the right-hand gate of the Add-Subtract flip-flop) goes to 0 potential and same is connected through NOR-gate 503 to NAND-gate 504. NAND-gate 504 operates in a similar manner in conjunction with the COL. 15 line to Nand the two signals therethrough and to cause the punching of the numeral 2 in column 15 of the card in the card punch.

As mentioned above, the Add-Subtract status is indicated by a lamp inside of each button. Accordingly, the occurrence of a 1 potential on output terminal T2 results in the Add lamp being energized and the occurrence of a 1 potential on the output terminal T1 energizes the Subtract light through the respective lamp drivers LD shown in FIG. 5.

As will be discussed *infra*, an Error flip-flop 406 (see FIG. 4) has an output line 415 which is directed to the inputs of both NOR-gates 501 and 503. These NOR gates function to permit the punching of a 3 (note the connections with the relay drivers in FIG. 6 so that the binary bit sum of 2 and 1 will be punched) in column 15 whenever the Error function is turned on. It is important to know that the 3 will be punched in column 15 whenever the Error function is engaged regardless of whether the Add or Subtract buttons have been depressed. This punching will occur because the Error line is tied directly to the inputs of the two NOR gates thereby immediately energizing same for a later Nanding with the column 15 interrogation (high condition on the COL. 15 line). However, the Error function does not disturb the Add-Subtract flip-flop so that as soon as the Error function is extinguished, the punching of a 1 or 2, depending upon whether the Add or Subtract switch is depressed, will recur and pick up without the need of resetting or reactivating.

The true control function of the control circuit board begins when the power is turned on at the remote power 1102 unit by the operator depressing the start button shown in FIG. 11. This button energizes the terminal labeled Initiate start as seen in FIG. 5. After passing through inverter gate 505, the start input is directed to inverter gate 506 which in turn drives the terminal labeled start/clear size and item. Also a line 507 from inverter 506 interconnects the Initiate start terminal with the A, Auto, B spec select circuits mentioned above and sets this system to the automatic condition. A further look at the size and item circuit boards (FIGS. 8a, 8b and 7a, 7b and 7c) indicate that the terminal labeled start/clear therein will cause (with a 0 potential thereon) the size and item memories to be set to the binary 0 condition.

The Initiate start line that is directed to the input of inverter gate 506 is also directed to inverter gate 508, the output of which is tied via line 509 to terminal T3 of Add-Subtract flip-flop 513 thereby automatically resulting in the setting of same to the Add position. Inverter 508, via line 510 also is able to reset the Quantity lockout flip-flop 511 (note the connection to the right-hand gate thereof) thereby enabling the Quantity keyboard. A line 510a (leaving the left edge of FIG. 5 and reappearing in the lower right-hand portion of FIG. 3 and in the upper right-hand portion of FIG. 4) is interconnected with the Item-size Ditch Depth lockout flip-flop 401 (FIG. 4), same also being reset thereby enabling the corresponding keyboards associated therewith. In this regard, it should be noted that the A, Automatic and B keys are "locked up" by the item size Ditch Depth lockout flip-flop 401 and that the Add-Subtract and clear keys are locked up by quantity lockout flip-flop 511.

Continuing on with the start signal (on line 510a in FIG. 4) the clear flip-flop 402 is set (note the interconnection with line 510a and the terminal T1 on the right-hand gate thereof) thereby causing the clear lamp to be energized via lamp driver 403. Also, the quantity register (FIGS. 9a and 9b) is cleared through the NOR-gate 404 (note the terminal connection T2 with the line 510a) and the second inverter gate 405 so that the clear/start quantity terminal is set equal to 0 and made ready for the operation. The start signal finally, is used to reset Error flip-flop 406 (note line 510a entering the left-hand gate of Error flip-flop 406).

A brief review of the above description will now indicate that the control system has been started.

As seen in FIG. 3, the COL. 1 indicator line coming out of gate 301 has terminal 301a which interconnects with the first thumb wheel switches 1104 which correspond to the left-hand digit of the estimate number. This COL. 1 signal sets up the output circuitry of the estimating device to punch or send a number to the terminating device as soon as certain conditions have been met within the control circuitry.

Following the COL. 1 indicator line from FIG. 3 into FIG. 4, it will be seen that this line resets Error flip-flop 406, however, since the Error flip-flop was effectively reset by the start signal, this connection does not materially affect the operation of the circuit at this time. The COL. 1 line then enters inverter gate 407 causing the potential on same to be indicated as a binary 1 level which is in turn applied to the input of NAND-gate 408, which is enabled whenever clear flip-flop 402 is reset. The clear flip-flop 402 can be reset by depressing a quantity key thereby allowing the output of NAND-gate 409 (directed to the left-hand gate or reset side of the clear flip-flop) to go to 0 potential. This NAND gate (409) is also connected via its terminal T1 with the output of the quantity lockout flip-flop 511 (see FIG. 5) and, as a result, this terminal is at 1 binary potential whenever the quantity is not locked out.

Since Quantity lockout flip-flop 511 is reset (e.g. quantity is not locked out at this point because the start circuit resets it) the NAND-gate 409 is enabled and a 0 potential is fed to the reset input of Clear flip-flop 402 (the left-hand gate) thereby causing a 1 potential output. This enables the NAND-gate 408 (located below the left-hand gate of flip-flop 402) since COL. 1 is at the 1 potential after having been inverted through 407. The output of NAND-gate 408 is then directed through NOR-gate 410 which in turn passes through relay driver RD-411 and onto the relay circuit board to cause the punching or output of the first digit of the numbers stored in the memory of the estimating device. As soon as the terminating device receives the information for the first column, a signal is returned to the estimating device causing the interruption of the punch-start circuit (on the relay circuit board which will be discussed in more detail *infra*).

Having performed in accordance with the COL. 1 instruction, the terminating device is now positioned at Column 2. It should be noted that the terminating device must be programmed so that the first column is operated on command from the estimating device but the second column is reached automatically as soon as information for the first column is received. When the second column is reached, the output on terminal 302a results in the output of the estimating device feeding the correct number back to terminating device through the second thumb wheel switch which is the second digit of the estimate number.

The second column indicator line (COL. 2) is applied to the input terminal T2 on the left gate of the Item size Ditch Depth lockout flip-flop 401 thereby resulting in the setting of the same. Columns 2 through 14 are now automatically strobed by the terminating device so no punch start signal is required from the estimating device. That is, at each column (which is set up in the binary coded input line) the terminating device strobes the memory of the estimating device to receive the information stored in that column. As soon as the output from the 14th column is received, the terminating device stops.

As mentioned above, the terminating device stops after the reception of the 14th column signal and is prepared for the (COL. 15) strobing of the estimating device. The occurrence of the COL. 15 condition causes several things to happen. First of all, the COL. 15 line shown in FIG. 5 (emanating from just below the COL. 15 inverter shown in FIG. 3) is interconnected with the NAND-gates 502 and 504 in the Add-Subtract circuit thusly enabling the punching of the Add-Subtract or Error signal for COL. 15. However, no output signal occurs until certain other conditions have been met at Col. 15.

One additional function which occurs at COL. 15 is to enable the Item, Size and Ditch Depth keyboards by "unlocking" (resetting) the Item Size Ditch Depth lockout flip-flop 401. Additionally, COL. 15 is applied (see FIG. 4) to the input terminal of NAND-gate 412 (located immediately to the left of the ISDD lockout flip-flop 401) so that if an Item, Size or Ditch Depth button is depressed (this includes the A, Automatic and B buttons also), the terminal T1 of the NAND-gate 412 goes to the 1 potential with the terminal T2 being held at 1 potential due to the fact that the terminating device is waiting at COL. 15 for further information. The output of the two 1 potentials (on terminals T1 and T2) are Nanded through gate 412, going through NOR-gate 410 which again drives a relay through relay driver RD-411 to start punching (assuming a card punch is being utilized). It should be pointed out that additionally COL. 15 signal is also applied to NAND-gate 413, same being Nanded with the Error signal on terminal 421 (and inverted therethrough) before entering the right-hand gate of the Error flip-flop 406. The output of the Error flip-flop is then delivered via line 415 to the NOR-gates 501 and 503 shown in FIG. 5 which are Nanded with the COL. 15 signal in the NAND-gates 502 and 504 as suggested above.

As soon as the terminating device receives the information contained in COL. 15 of the memory of the estimating device, a signal is returned to the estimating device indicating that the information has been received. (Keyboard Restore) The terminating device then strobes columns 16 through 21 in a manner similar to that described above with respect to columns 2 through 14. It should be noted that COL. 16 sets the quantity keyboard lockout flip-flop 511 so that the quantity input is "locked up" until all quantity information has been strobed out of the memory of the estimating device. As soon as columns 16 through 21 have been strobed, the terminating device stops at COL. 22.

At COL. 22, the quantity lockout flip-flop 511 (FIG. 5) is reset along with Item Size Ditch Depth lockout flip-flop 401 (note the COL. 22 input to the right-hand gate of flip-flop 401 shown in FIG. 4). At this particular point in the system description with the normal operating mode being considered, the resetting of flip-flop 401 by the COL. 22 signal is not particularly important since it has been reset at the COL. 15 condition. However, under another mode, discussed *infra*, this reset condition is necessary.

In addition to its connection with flip-flop 401, the COL. 22 line is directed to inverter 416 and from thence to two NAND-gates 417 and 418. The NAND-gate 417 Nands the function, COL. 22, with $\bar{E}$ (Error Not) which is indicated in Boolean algebra terms on the line leading from the output of NAND-gate 417 as $\bar{E}$·COL. 22. At COL. 22 and $\bar{E}$, the clear flip-flop 402 is set (note terminal T2 of the right-hand gate thereof) and the register containing the Quantity is set to 0 through NOR-gate 404. As soon as clear flip-flop 402 is set, NOR-gate 419 (receiving the input from clear flip-flop 402 on its terminal T1) is opened and the output of same Nanded together with COL. 22 in NAND-gate 418. As a result, when the Quantity register is clear, the Clear flip-flop 402 is set, and COL. 22 is indicated on the binary inputs to the estimating device, a skip relay driver is energized causing the terminating device (assuming the use of a card punch) to skip the rest of the columns in the punched card and return to COL. 1 of the next card. In this regard, the output of NAND gate is inverted in gate 418 and delivered to the skip relay driver RD-skip. If a terminating device other than a card punch is used, the skip line (FIG. 4) would reset the counter of the terminating device to COL. 1.

The control circuit board also contains additional operational circuits which will now be discussed. For example, the terminal on the left-hand portion of FIG. 6 marked start return is operable to indicate to the Start Relay in the remote unit of the estimating device that all Start functions have been completed. As stated above, the operator of the estimating device depresses the Start button as soon as the power is turned on at the remote power unit (FIG. 11). The NAND gate (609) which is connected to the start-return line, Nands together the functions quantity equal to 0; item equal to 0; size equal to 0; and ditch equal to 0. Since there are only a few (one or two) flip-flops involved in any of the other Start reset functions, it is generally not necessary to interrogate same since the Item, Size and Ditch Depth registers have numerous flip-flops and would take longer to reset than any single flip-flop. As soon as all these 0 conditions are met, NAND-gate 609 has its output passed through inverter gate 610 and on to the relay driver RD-S/R which enables the Start Relay (located on the relay circuit board) which operates in conjunction with other signals to complete the starting sequence of the estimating device.

Located to the left of the start-return terminal is "Quantity ready light" and an "Item ready light." The Quantity and Item ready lights are extinguished when their corresponding keyboards are locked out. There is also a lockout Item, Size, Ditch Depth, A, Automatic and B terminal (FIG. 4) which is the ground terminal under normal conditions to the Item, Size, Ditch Depth, A, Automatic and B buttons. When this portion of the keyboard is locked out, the terminal is raised to the binary 1 thereby disabling the keyboard.

The "Quantity Add-Subtract" (QTY, ADD, SUB) lockout line is also connected to the clear pushbutton and disables this portion of the keyboard during lockout. Another terminal labeled clear/start DD (clear/start Ditch Depth) causes the Ditch Depth register to be set equal to 0 when the estimating device is started or when one of the Item, Size or A, Automatic or B buttons is depressed, however, the function which causes the resetting of the Ditch Depth register also is gated by a lockout. Since the Item, Size Enter terminal 612 is held at 0 potential until one of the buttons representing either the Item, Size or A, Automatic or B buttons has been depressed, the depression of same breaks the ground circuit which is made through all of the buttons, mentioned immediately above, to the lockout terminal and allows terminal 612 to go to binary 1 potential. Since lockout will also allow terminal 612 to go to binary 1 potential, it is necessary to Nand together the function "Item, Size enter and lockout not" in the NAND-gate 613. This function is then directed to NOR-gate 614 with the start-clear signal, inverted through gate 615 to the clear/start DD (Ditch Depth) terminal shown on the lower left-hand portion of FIG. 6.

The terminal 420, located above the clear flip-flop 402, (FIG. 4) is connected to the manual Clear switch which can be depressed to set the clear flip-flop 402 and the Quantity Storage resister (through gate 404) equal to 0. In this regard, one side of the Clear switch is connected to 0 potential through the lockout quantity flip-flop 511. When the clear button is depressed, 0 potential is applied to the right-hand gate of the clear flip-flop 402 via terminal T3 in order to set same, while at the same time, the signal is applied to the quantity register (through gate 404) clearing same or setting it equal to 0. If the quantity lockout flip-flop is in the lockout position, then the depression of the clear button does not cause the terminal 420 to go to the 0 potential. When the quantity lockout flip-flop is set, depression of the clear button does not clear the register nor set the clear flip-flop.

The final operating elements on the control circuit board which are operative when the estimating unit is being used in its normal mode (the encoding of descriptive and quantity information) is the Error function. This function is necessary since the entry of a quantity causes a transmission to the terminating device and the punching of the first 14 columns of information in the case of the card punch. These first 14 columns contain the descriptive information so that if the operator of the estimating device observes that he has made an error in describing the item of which he has already inserted the quantity on the 10-key quantity input keyboard, the operator still has a way of telling the computer (which will eventually read the cards, or the on line terminating device) that an error has been made.

As mentioned above, after the first 14 columns of information have been transmitted from memory of the estimating device to the terminating device, the terminating device waits at column 15 for a Start signal in order to strobe through column 21. If an error is recognized at column 15 by the operator of the estimating device, the Error pushbutton which is connected to terminal 421 (see FIG. 4) may be depressed which causes same to go to a 0 potential. This function is inverted in inverter 414 and Nanded with the COL. 15 line. When COL. 15 and the error button condition are both present on the input of the NAND gate, the error flip-flop 406 is set which lights the error light through the error lamp driver LD-error.

Additionally, after the operator has depressed the correct descriptive button allowing the quantitative information to be transmitted or punched, a 3 is punched (as described above) or transmitted in the 15th column. This indicates to the terminating device that an error has been made. In the case of the card punch, the computer which reads the output cards of the estimating device is set to disregard any cards with a 3 in the 15th column. Assuming that the 15th through the 21st columns have been punched, if the Error button were not engaged, the register would be cleared and the clearing of this register would generate a skip or reset for the terminating device at column 22. However, when the Error button is engaged and COL. 22 is reached, the quantity register is not set to 0 and clear flip-flop 402 is not set because of the function, error not ($\bar{E}$) and COL. 22, "not" being Nanded together. That is to say, when Error is present at NAND-gate 417 (the NAND gate which Nands COL. 22 and error not ($\bar{E}$) together), the correct signal is "not" derived at the output of this NAND gate to set Clear flip-flop 402 and to set the quantity register equal to 0.

Additionally, the Error signal and COL. 22 allow the skipping to take place. This is accomplished by applying the Error and clear functions together in NOR-gate 419 and the Nanding the output of either the Error or clear flip-flops with COL. 22 in NAND-gate 418 to generate the skip function. Resetting the terminating device to column 1 allows the immediate punching of the first 14 columns of information since the conditions for punching column 1 are only that column 1 be indicated and that clear flip-flop 402 be in the reset or in the not clear condition. This is true since the Error function has blocked the setting of the clear flip-flop. Therefore, two cards are generated when an error in descriptive encoding occurs. The first has a 3 in the 15th column indicating an error has been made and that the card is not to be regarded. The second card has the corrected descriptive information and when column 1 of the second card is reached, the Error flip-flop is reset allowing the estimating device to go back to its normal sequence of operation and to punch a 1 or 2 in the 15th column, depending on whether the Add or Subtract button has been depressed.

When the estimating device is used in conjunction with the card punch, it is sometimes desirable to use the Automatic descriptive encoding portion of same without the quantitative storage portion. This is true because punch cards must be generated with descriptive encoding only, (generated automatically by the estimating device) and pricing and alphabetic descriptive information generated manually. Using my estimating device to automatically encode pricing cards greatly increases the speed of the pricing operation and insures that the codes in the price cards will match the codes generated by the estimating device for the corresponding time. In order to use the estimating device as a price card coding device, the terminating card punch must be programmed to generate the column binary codes in the following order: 1, 2, 8, 9, 10, 11, 12, 13, 14, and 22.

When the estimating device is being used in the coding mode, the estimate number is set to 0. This allows the use of columns 1 and 2 to punch a fictitious 0 code in the columns of the price card which correspond to the Ditch Depth columns of the quantity card. Columns 8 through 14 contain the actual encoding information for the part which is to be priced and described on the price card. The card punch is programmed by its own internal program on a drum card to skip columns 1 through 5. The card then stops at column 6 which is coded with the binary column 1. This allows the operator to set up the appropriate codes by depressing a Size and Description button and having a present material specification number on the code wheels which will punch into columns 13 and 14. As soon as he has set the description of an item, the operator then depresses one of the 10-key Quantity keys, allowing the punching of binary coded column 1. The card punch then strobes columns 2 and 8 through 14, thereby encoding the item which is to be priced and alphabetically described on the card. At the end of column 14, a column 22 should be encoded causing the clearing of the register and the skipping of the next card where the card punch will skip under its own program from columns 1 through 5 of the card and stop at column 6 which is binarily encoded into the input of the estimating device as column 1.

An optional column 21 may be placed in the binary coded drum card of the card punch to cause the punching of a 0 in column 15 of the price card. A number 0 in the price card indicates to a computer (which may be utilized to process same) that this card is a price card. If this option is used, the "multiply by encoding thumb switches" 1104 must be set equal to 0, so that a 0 will be punched when the binary coded column 21 is indicated. With this sequence of operation in mind, it should now become obvious why both columns 15 and 22 reset the lockout for item, size, and Ditch Depth circuitry. As discussed above, the Item, Size and Ditch Depth pushbuttons are "locked up" at column 2 and will remain so until a column 15 or column 22 is encoded on the binary input lines.

Since the estimating device is being used to prenumber the price cards, column 15 is never encoded and it is necessary to apply the column 22 reset signal to the item size Ditch Depth lockout flip-flop 401 (FIG. 4) in order to enable the appropriate pushbuttons on the control panel to be used to set up the next item for encoding purposes.

The remaining function of the control circuit board is initiated when the input terminal labeled COL. 32 is switched on (i.e. when the terminal is connected to "0" potential through the terminating device). When this function is engaged, a single column of punching will occur (or if the terminating device is not a card punch a single column of information will be transmitted) for each depression of the 10-key quantity input. For example, if a column 18 is set into the 5 level binary input decoder, the number which will be punched will be the units digit of the quantity storage register (see FIGS. 9a and 9b). By using this mode of operation, the 10-key input quantity keyboard of the estimating device control panel can be used to manually punch or transmit data one column at a time.

The above mentioned "one column at a time circuit" operates with a column 32 (or special function signal) being generated at the terminating device and inverted through the inverter gate as shown in FIG. 5. When a quantity key is depressed, the clear flip-flop 402 is reset and the number is entered into the units digit of the quantity storage register which is column 18 of the memory. Column 18 is encoded in the 5 level binary input, thus the output lines of the estimating device indicate in binary coded decimal form the number which is stored in column 18.

The punch block flip-flop 422 is normally in the reset position, however, since the register was cleared when the column 32 or special function signal was first applied to the estimating device, the combination of the punch block flip-flop 422 being the reset position, the register not being cleared and the column 32 or special function signal being applied to the input terminal NAND-gate 423, result in these signals being Nanded together therein. Thusly, when all these conditions are met, a punch start signal transmits the data in column 18 of the memory to the card punch or other terminating device. As soon as the terminating device receives this information, it generates a keyboard restore (or data received function) which is connected to the keyboard restore terminal located on FIG. 5. The keyboard restore signal is Nanded together with column 32 in NAND-gate 514 (see FIG. 5), inverted in gate 514a (FIG. 4) and Nanded with the "quantity enter" (QE) signal in NAND-gate 424. The output from gate 424 sets punch block flip-flop 422 when the quantity key is depressed and the column 32 or the special function signal is present and the keyboard restore or data received signal is present. The setting of punch block flip-flop 422 closes the NAND-gate 423 which allows the punch start signal to continue and thereby interrupts this signal.

When the quantity key is released, NAND-gate 425 Nands the function column 32 and quantity not entered (QĒ) together to produce an output that sets clear flip-flop 402 and at the same time sets the quantity register equal to 0. When this is accomplished, the output from clear flip-flop 402 (the right-hand gate thereof) is Nanded together with column 32 in NAND-gate 426 to reset the punch clock flip-flop 422 (applied to the left-hand gate) and to allow the next key stroke to cause the punching of a second number. This process is repeated as many times as necessary to manually punch any number of digits required. It is either desirable to encode a column 22 at the end of any field which uses a special function to assure that the register is clear and to cause skipping to the next card if the card punch is used or, resetting of the counter, if some other terminating device is used.

Relay Circuit Board

The relay circuit board is disclosed in FIG. 10. The upper portion of this figure indicates that a plurality of buffer circuits, generally indicated by the number 1001, are located between the terminating device and the control system of the estimating device. These buffer circuits isolate the noise produced by the high potential switching circuits found in the card punch (or other device using electromagnetic components such as relays) which could otherwise be carried through the wiring to the low level logic found within the control panel of the estimating device.

Directly below the buffer circuits 1001 is the main readout system for the estimating device. A terminal labeled "Start Return" is located on the left-hand side of FIG. 9 and comes from the control circuit board (FIGS. 3, 4, 5 & 6). As mentioned above, the condition of the Start Return signal indicates when the starting sequence within the jurisdiction of the control circuit board has been completed. When this condition has been met, the relay K-1 is energized. This relay connects power from the terminating device via line 1002 (150 DC) to the relay K-2. Relay K-2 "latches up" (the armature of the relay goes down) bypassing the terminals of relay K-1 with a set of terminals associated with relay K-2. In this regard, the relay armature R-2a closes, lighting the "Start lamp" to indicate to the operator that the start function is completed. The "Start Lamp" remains on throughout the operation of the estimating device unless power is interrupted to the terminating device in which case, the information exchanged between the terminating device and the estimating device may be incorrect or garbled. Therefore, relay K-2 drops out (with its associated armature assuming the up position) and will not pull in until the operator has depressed the start button to restart the estimating device and interconnect same with the terminating device.

The relay armature R-2b provides for the interconnecting of the estimating device with the terminating device in that this armature is connected to the terminal labeled "0" potential via line 1003 (located at the lower right-hand corner of the figure). Connection to this "0" potential terminal (same being derived from the terminating device) allows the transmission of information from the estimating device to the terminating device.

The relay K-9 (located in the lower right-hand portion of FIG. 10) serves an important function in that it operates to provide a signal to the control circuit board indicating that the terminating device has received data when the estimating device is in the special function capacity where, rather than having the terminating device strobe the memory of the estimating device, the estimating device is sending information and waiting for an information received signal. This signal is commonly referred to as keyboard restore in a card punch. At columns 1, 15 and 22 the function (indicating that the terminating device has received information) is performed as follows. Relay K-9 operates to interrupt the "0" potential. This is done to allow the terminating device to move from column 1 to column 2 and not indicate the column 1 information in column 2. Stated another way, columns 2 through 14 and 16 through 21 are strobed by a pulse generated in the terminating device and this pulse has to be properly timed with respect to the opening of the gates within the terminating device to receive information from the estimating device. However, the "0" potential would remain connected as the terminating device moved from column 1 to column 2 if relay K-9 did not break the "0" potential line so that information from column 1 would be set while the terminating device was in the column 2 position. At this time, a strobe pulse for column 2 would be received by the estimating device and information for column 2 would be sent thereby garbling column 2. Columns 15 and 16 operate in a similar manner and relay K-9 is interposed so that the information at columns 2 and 16 will not be garbled. Therefore, the "0" potential is interrupted as soon as the terminating device receives information for columns 1 or 15 or in the special function mode of operation of the estimating device.

The terminal labeled "Punch Start" is connected to relay K-3 which closes on command from the control circuit board. The relays K-4, K-5, K-6 and K-7 are the binary to decimal decoding relays which are connected to the relay drivers (RD) on the control circuit board with their contacts so arranged that the binary coded decimal will be converted to a decimal output. For example, the decimal number "5" is equivalent to binary 1 plus binary 4. If "5" is to be punched relays K-4 and K-6 armatures would be pulled down thereby completing a circuit path to the "5" punch terminal from point "P".

In addition to obtaining "0" potential at point "P" for the purpose of sending information to the terminating device through the keyboard restore relay, the start and punch start relays, a second line (1104) is obtained from the terminating device. This line has a strobe pulse generated within the terminating device properly timed to interrogate the memory of the estimating device for columns 2 through 14 and 16 through 21.

The skip relay is located in the lower right-hand portion of FIG. 9 and utilizes the skip signal which is derived from the control circuit board and which terminates at the skip terminal (see the lower left-hand corner of FIG. 9). When the skip relay is energized and the associated contacts pulled downwardly, skipping is caused within the card punch or resetting of the counter within any other terminating device to column 1.

The two remaining relays, K-10 and K-11 are used when the estimating device is connected to the card punch to allow the card punch to be used in its normal mode when power is turned off at the estimating device. These relays are simply tied across a power supply voltage within the estimating device and when the power is turned off, the relays reconnect portions of the card punch circuitry which needs to be interrupted so as to allow the estimating device operation to go back to its original configuration.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A device implemented method of encoding the description and quantity of an item described by related variables of both an independent nature, said method comprising the steps of
   presetting the nonarithmetical relationship between independent and dependent variables on an encoder control panel,
   labeling the origin of said item,
   describing the characteristics of said item,
   quantitizing the amount of said item relating to said variables, and
   displaying visually the related variables and the origin, characteristics and quantity of said item on said control panel prior to transferring the displayed information therefrom.
2. The invention as in claim 1 including the step of transmitting the encoded information corresponding to the step of describing the characteristics of said item when said item is quantitized.
3. The invention as in claim 2 including the step of transferring said visually displayed information as a unit record to a form which is capable of being interpreted by a machine.
4. The invention as in claim 2 including the steps of
   remembering specific descriptive information concerning certain items and
   associating said remembered information with each item having said specific descriptive features, said specific descriptive information thereby being automatically encoded with each of said corresponding items.
5. The invention as in claim 1 including the step of transmitting the information corresponding to the step of quantitizing the amount of said item when the characteristics of said item are described.
6. The invention as in claim 5 including the step of transferring said visually displayed information as a unit record to a form which is capable of being interpreted by a machine.
7. The invention as in claim 1 including the step of
   combining preselected ones of said described characteristics and said quantitized amount of said item,
   said combining step operable to determine the amount of excavation required to install said encoded item.
8. The invention as in claim 1 including the step of
   storing all information relative to quantity and description of an item, said displaying step operable to display only information stored by said method prior to transferring same.
9. The invention as in claim 8 including the step of
   interrogating said stored information in a preselected encoding sequence.
10. The invention as in claim 8 including the step of
    preselecting a particular specification designation to be automatically associated with each of said items relating to said particular specification.
11. The invention as in claim 8 including the step of
    adding a preselected amount to a quantity of said encoded items.
12. The invention as in claim 8 including the step of
    subtracting a preselected amount from a quantity of said encoded items.
13. The invention as in claim 8 including the step of:
    locking portions of said control panel to preclude the encoding of certain information during the functioning of other of said transmission of said previously encoded information.
14. The invention as in claim 8 including the step of
    indicating that certain of said stored information has been received after the transferring of same.
15. The invention as in claim 8 including the step of
    signaling an error in the encoding of said stored information.
16. The invention as in claim 15 including the step of
    interrogating said stored information in a preselected sequence.
17. The invention as in claim 16 including the step of skipping portions of said stored information during said interrogating step.

18. A system for encoding the description and quantity of times normally utilized for estimating purposes, said system comprising:
a control panel, said panel having a plurality of switches which may be set to positions corresponding to the description and quantity of said items, each of said switches having a preselected partial item description condition,
a power and program unit,
a terminating device,
means interconnecting said control panel, said power and program unit and said terminating device, said terminating device operable to interrogate said control panel and to receive sequential information therefrom in order to effect the encoding of said description and quantity of said items as indicated by the condition of said switches.

19. The invention as in claim 18 including means for connecting said control panel for operation at a location remote from said terminating device.

20. The invention as in claim 18 wherein said terminating device is comprised of a card punch, said card punch being operable to receive said sequential information from said control panel and to produce a unit record per item therefrom.

21. The invention as in claim 18 including means for storing said information corresponding to the condition of certain ones of said switches.

22. The invention as in claim 21 including means for visually indicating what information is being stored by said storing means, said indicating means thereby being operable to display to an operator of said system the information that has actually been stored therein for encoding purposes rather than what was attempted to be stored.

23. The invention as in claim 18 wherein preselected ones of said switches designate descriptive characteristics and quantity of said items, and
means for transmitting encoded information associated with the descriptive characteristics switches when said quantity switches are set.

24. The invention as in claim 23 including means for visually displaying said selected descriptive characteristics and said selected quantity of said items on said control panel prior to same being transmitted.

25. The invention as in claim 18 wherein preselected ones of said switches designate descriptive characteristics and quantity of said items, and
means for transmitting the quantity information associated with said quantity switches when certain of said descriptive switches are set.

26. The invention as in claim 25 including means for storing selected information relative to said characteristics and said quantity of the items, means for visually displaying the stored information, and
means for transferring said visually displayed information from said control panel as a unit record to a form which is capable of being interpreted by a machine.

27. The invention as in claim 18 including means for remembering preselected specific descriptive information concerning certain ones of said items, and
means for associating said remembered information with each item having said specific descriptive features, said specific descriptive information relative to said features thereby being automatically encoded with each of said corresponding items.

28. The combination as in claim 27 including means for modifying the association of the preselected descriptive information with certain items having said descriptive features.

29. The invention as in claim 27 including means for storing selected information relative to said characteristics and said quantity switches, and means for visually displaying said stored information prior to transmitting same.

30. The invention as in claim 29 including circuit means for transferring said information as a unit record to a form which is capable of being interpreted by a machine.

31. The invention as in claim 18 including circuit means for indicating the arithmetic sign of the transmitted quantity.

32. The invention as in claim 18 including means for preselecting a particular specification designation to be automatically associated with each of said items relating to said particular specification.

33. The invention as in claim 18 including means for locking certain of said switches on said control panel to preclude the acceptance of certain related information, said locking means thereby prohibiting inadvertent utilization of said switches which could garble other information being transmitted.

34. The invention as in claim 18 including means for indicating that said terminating device has received certain information corresponding to the position of said control panel switches.

35. The invention as in claim 18 including means for signalling said terminating device of an error condition in the information transferred thereto.

36. The invention as in claim 35 including means operable as a result of the functioning of said error means for interrogation of said control panel out of said preselected sequence.

37. The combination as in claim 18 wherein said device includes an additional series of switches, said additional switches operable to transfer information that modifies the description of the items.

38. The combination as in claim 37 including means for nullifying the effect of said additional switches when said first mentioned descriptive switches are utilized.

39. The combination as in claim 18 including means for storing a preselected constant by which all quantities are to be multiplied.

40. The combination as in claim 39 including means for transmitting the multiplied constant each time said quantity is transmitted.

41. The combination as in claim 40 including means for transmitting a code to nullify said multiplier constant.

42. The combination as in claim 21 including means for generating a code number, said code number having a logical relationship to the described item.

* * * * *